United States Patent [19]
Yokoyama et al.

[11] Patent Number: 5,899,552
[45] Date of Patent: *May 4, 1999

[54] SURFACE LIGHT SOURCE DEVICE

[75] Inventors: Kazuaki Yokoyama, Ageo; Takayuki Arai, Kasukabe; Yasuhiro Koike, 534-23, Ichigao-cho, Midori-ku, Yokohama-shi, Kanagawa, 225, all of Japan

[73] Assignees: Enplas Corporation, Saitama; Yasuhiro Koike, Kanagawa, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,405

[22] Filed: Mar. 11, 1997

Related U.S. Application Data

[63] Continuation of application No. 08/337,371, Nov. 8, 1994, abandoned.

[30] Foreign Application Priority Data

Nov. 11, 1993 [JP] Japan ..................................... 5-305823
Mar. 31, 1994 [JP] Japan ..................................... 6-083718

[51] Int. Cl.$^6$ ..................................................... G02B 6/26
[52] U.S. Cl. .............................. 362/31; 362/331; 385/27; 385/31; 385/146; 349/62
[58] Field of Search ................................ 362/26, 27, 31, 362/329, 330, 331, 332, 339, 340, 335; 349/61, 62, 64, 65; 385/27, 31, 146, 901, 15, 28, 42, 29, 30, 124

[56] References Cited

U.S. PATENT DOCUMENTS

| | | | |
|---|---|---|---|
| 5,295,048 | 3/1994 | Park et al. ................................. | 362/26 |
| 5,542,017 | 7/1996 | Koike . | |
| 5,548,670 | 8/1996 | Koike ....................................... | 385/27 |
| 5,580,932 | 12/1996 | Koike ....................................... | 525/276 |

FOREIGN PATENT DOCUMENTS

| | | |
|---|---|---|
| 51-89888 | 7/1976 | Japan . |
| 62-235905 | 10/1987 | Japan . |
| 1-172801 | 7/1989 | Japan . |
| 1-236257 | 9/1989 | Japan . |
| 1-269901 | 10/1989 | Japan . |
| 2-13925 | 1/1990 | Japan . |
| 2-245787 | 1/1990 | Japan . |
| 2-221925 | 9/1990 | Japan . |
| 4-140783 | 5/1992 | Japan . |
| 4-145485 | 5/1992 | Japan . |

OTHER PUBLICATIONS

Partial English translation of Japanese Reference No. 63–63083, already of record, copy attached.
Partial English translation of Japanese Reference No. 51–89888, already of record, copy attached.

(List continued on next page.)

*Primary Examiner*—Thomas M. Sember
*Attorney, Agent, or Firm*—Staas & Halsey

[57] ABSTRACT

A light incident into a wedge type light scattering conducting element from a light incident surface of the light scattering conducting element is converted into a light flux having a directionality and is output from a light output surface. The output light is input to a wedge type emitting direction characteristic adjusting element arranged with a positional relationship complementary to the light scattering conducting element. A prism shaped irregularity for adjusting a propagating directionality of the light in longitudinal/transverse directions is formed on a light input surface/light output surface of the wedge type emitting direction characteristic adjusting element. The wedge type emitting direction characteristic adjusting element has a weakened scattering power depending on requirements, thereby a degree of directionality sharpness of the light emitted from a surface light source device is adjusted. Various modifications are provided for the light scattering conducting elements, and regions having different scattering powers are combined for various patterns. The device is useful for A backlight source.

16 Claims, 14 Drawing Sheets

OTHER PUBLICATIONS

"Polymer Reprints, Japan vol. 41, No. 3," (1992), p. 802.

"Polymer Reprints, Japan vol. 41, No. 7," (1992), pp. 2945–2947.

"High Brightness Light Scattering Transmission Body", Yasuhiro Koike et al., *Polymer Reprints,* Japan, vol. 41, No. 7, (1992), p. 2944.

"High Brightness Light Scattering Transmission Body and Its Structure", Megumi Izuhara et al., *Polymer Reprints,* Japan, vol. 41, No. 7, (1992), pp. 2945–2946.

(a)

(b)

SURFACE LIGHT SOURCE DEVICE

CROSS-REFERENCES TO RELATED APPLICATIONS

This application is a continuation of Ser. No. 08/337,371 filed Nov. 8, 1994, now abandoned.

BACKGROUND OF THE INVENTION

I. Field of the Invention

This invention relates to a surface light source device. In more detail, the invention relates to a surface light source device using an optical element (hereinafter referred to as "a scattering light conducting element") having a function to conduct an incident light while scattering in a volume region. The invention can be adapted to an optional application requiring a high uniform emitting light flux, and in particular, effectively utilized as a display backlight source means of a liquid crystal display device, etc.

II. Description of the Prior Art

Conventionally, heretofore known are various kinds of surface light source devices of the type capable of emitting the light in a desired direction using the scattering phenomenon, those of which are used for a backlight source of the liquid crystal display devices or the like.

One similar type of such known surface light source devices, includes a light emitting panel in which a light incident means is provided on a lateral side of a light conducting element made of a plate shaped transparent material, a reflection element is provided on a back surface-side, and a light scattering property is given adjacent a front surface-side surface to produce a light emitting surface, and which is used as a backlight of the liquid crystal display device and the like.

Such devices are disclosed in Japanese Patent Laid Opens Sho-62-235905 in 1987, Sho-63-63083 in 1988, Hei-2-13925 in 1990, and Hei-2-245787 in 1990.

Those surface light source devices, spreading in the light emitting direction are produced by irregular reflection or mirror reflection adjacent to the light conducting element or on reflection elements, and the light scattering is not generated in a volume shape from inside of the light conducting means, Therefore, it is theoretically difficult to sufficiently raise a rate of scattering light outputted from the scattering light conducting device.

In the surface light source device, to obtain a uniform irradiation degree, a tilt depending on distance from the light incident means must be given to reflectivity of the reflection element as shown in the known disclosures above. This introduces a complicated larger type structure together with a higher manufacturing cost.

When the surface light source device is used for the backlight of the liquid crystal display devices and the like, there must be sacrificed some of requirements such as brightness, uniformity of irradiation degree, a thinner construction, and economy and the like.

As a second similar type of the known surface light source devices there is used a light diffusing plate in which particle substances having a different refractive index from an extended plate shaped transparent material are diffused into the inside of the transparent material.

The similar types of those are disclosed in Japanese Utility Model Registration Patent Application Laid Open Sho-51-89888 in 1976, Japanese Patent Application Laid Opens Hei-1-172801 in 1989, Hei-1236257 in 1989, Hei-1-269901 in 1989, Hei-2-221925 in 1990, and Hei-4-145485 in 1992.

Japanese Patent Application Laid Opens Hei-2221925 in 1990 and Hei-4-145485 disclose that a light is incident from lateral side of the plate shaped light scattering conducting element, where a reflection element is arranged on surface side of one-side, the other side surface is made a light emitting surface, and this forms a backlight source of the liquid crystal display device and the like.

In these arrangements, a light scattering arises in a volume shaped manner due to irregularity of the refractive index produced by the particle substances scattered and mixed into the inside of the transparent element.

However, various counter measures to uniform illuminance as a surface light source in those surface light source device are employed; namely, to give a gradient to a diffusing concentration of the particle substance which is diffused into the scattering light conducting element; to provide a scattering enforcement means such as mesh shape or dot shape by using light dispersing ink and the like on the back-side of the light scattering conducting element; or in some cases to give a gradient on a density of the mesh shape or the dot shape.

Conventionally, there has been employed a method comprising the step of, raising at most the light scattering power where a scattering power is lowered at a part adjacent to a light source together with the decrease of the scattering power at a portion adjacent to the light source, or raising the light scattering power at most including an enforcement layer of a mesh shape or a dot shape on the backside at a position apart from the light source.

In the background where conventionally the method as described above has been employed, in fact it is an advantage that, to avoid deterioration of illuminance apart from the light source, there must be provided a gradient of the light scattering power in any form depending on a distance from the light source in the case where the light scattering conducting light element is formed by dispersing particles having a different refractive index into the matrix, in addition to a history where it has been considered that generally a scattering enforcement means of a back surface region of the scattering light conducting element is indispensable for maintaining the required amount of scattering light, in the ordinary sized scattering light conducting element.

For another form of technique of the second similar type, it is proposed that a shape of the light scattering conducting element is made a wedge shape or a triangle roof shape, and without providing gradient to a different refractive index substance diffusion density itself within one light scattering conducting element.

For example, Japanese patent Laid Open Hei-4-140783 in 1992 disclosed the surface light source device using a plate shaped member combined by a relationship in that a light scattering conducting element (an opalescent substrate) having a mountain (L character) shaped sectional view is arranged apart from an object to be illuminated, and a transparent substrate having a complementary shape thereto is arranged in the vicinity of a side of the object to be illuminated. A light source is disposed on a lateral side of the plate shaped member. In the surface light source device, a light emitted from the light source travels mainly through the transparent substrate to be incident on the opalescent substrate, where the scattered light travels again through the transparent substrate to be emitted from a surface adjacent a side of the object to be illuminated. As a result, passing two times through a boundary surface between the opalescent substrate and the transparent substrate, this then produces a larger light loss disadvantageously.

A surface light source device has been proposed in which, using the so called injection type polymerization, the light scattering conducting element is formed into one sheet of plate shape by combining two wedge type light scattering conducting elements having different scattering powers which have allowed different refractive index substances to uniformly disperse into each polymer matrix, and thus, a light is incident from the lateral direction (see "PCT/JP92/01230", "Polymer Reprints, Japan Vol. 41, No. 3; 1992", p802, and "Polymer Reprints, Japan Vol. 41, No. 7; 1992", p2945 to 2947).

In the prior art, it is difficult to raise an efficiency for light utilization of the surface light source device in that the light is incident from a lateral direction of a transparent materiel of an extending plate shape and a reflecting element is arranged on one-side surface and a light diffusion property is given adjacent to the other-side front surface. If a rise of illuminance of the light emitting surface is intended, the various enforcement means are more required with the increase of a thickness of the device, producing a disadvantage economically.

In the type using such transparent plate, in the case where a mesh or dot shaped enforcement layer is provided on a backside surface of the transparent plate for enforcing a scattering power and unifying a illuminance distribution, then a drawback arises where the mesh of enforcement layer or the pattern of dots is transparently seen on observing the light scattering conducting element from the light emitting surface-side. In order to prevent this, a light scattering powered film or the like is arranged also on the light emitting surface-side. However, such additional structure causes absorption of the light and produces deterioration of the efficiency for light utilization. Moreover, manufacturing cost is raised with a complicated structure of the device.

On the other hand, combining the-light scattering conducting element with the light source element on which a light is incident from its lateral direction, thereby to produce a surface light source device, and even when employing a means of providing a gradient to a diffusion concentration itself of the particle substance diffused into the light scattering conducting element or of providing the light scattering enforcement layer of the mesh shape or dot shape or the like by using the light diffusion property ink and the like on a back surface-side of the light scattering conducting element, it is impossible to avoid disadvantages, such as the complicated structure of the devices, complicated manufacturing processes, and high grade of the devices and manufacturing processes respectively following the additional technical means.

For a scattering power gradient providing means, in the case of employing a procedure of forming the enforcement layer of mesh shape and dot shape on the light scattering conducting element back surface portion or providing a gradient on the scattering power of the enforcement layer, then a predetermined gradient is required for a distribution density of the mesh or dot patterns, the manufacturing process becomes more complicated, therefore this apparently introduces more disadvantages than the case of forming the simple scattering enforcement layer in view of the manufacturing cost.

In the case where a uniform brightness is intended for the surface light source device by giving a gradient to the diffusion density of a substance having a different refractive index diffused into the polymer matrix, then it is not always easy for industrial technique to manufacture in a rapid and stable manner the light scattering conducting element having a diffusion density gradient as intended, where such is not considered as a technique suitable for mass production.

The technique, which has been proposed by the present inventors, is of a high efficiency of scattering and is capable of relatively freely setting an average scattering power and a scattering gradient.

However as in the Laid Opens and specifications, there arises the same problem as above where the gradient is given to the different refractive index diffusion density of the light scattering conducting element in view of mass production since the product is manufactured by the injection type (casting) polymerization as a wedge shaped light scattering conducting element.

In the surface light source device of the type using the conventional light scattering conducting element, a light amount for emitting from a light output surface is to be secured through making a traveling direction of the light to be random by a light scattering operation given to the inside of the light scattering conducting element, and not rendering a prior condition of the technical problem for allowing the emitting light from the surface light source device to have a particular directionality. Therefore, it is difficult to adjust distribution of a propagation direction of the emitting light from the scattering, light conducting element.

In those circumstances, it is proposed that a directionality of the emitting light of the surface light source device be adjusted by additionally arranging a light emitting direction correction element on a light emitting surface of the light scattering conducting element. However because the light emitting direction correcting element used therein is not a wedge type, the following problems arise.

(1) When combining with the light scattering conducting element of the wedge type, it is difficult to form a whole thereof into a uniform thickness because of a thickness difference between the light incident surface-side and the end portion.

(2) A technical means for adjusting an intensity of the directionality of the light emitted from the surface light source device. There has not yet been proposed an idea in that an intensity of a directionality of the light emitted from the surface light source device is adjusted through an intensity of a scattering power given to the light emitting direction correcting element.

(3) In the case where the known thin sheet shaped light emitting direction correcting element is used for suppressing a thickness of the surface light source device, the manufacture thereof by a simple emitting forming method is difficult. This must be prepared as separated parts by another manufacturing method from the light scattering conducting element. Therefore, it is not advantageous in view of manufacturing cost.

(4) To obtain a light emitting direction correcting function (hereinafter referred to simply as "transverse direction") as viewed from a light incident surface-side of the light scattering conducting element, two sheets of light emitting direction correcting elements are required to be arranged orthogonally with each other. This introduces an increase of the number of parts and a more complicated manufacturing process.

SUMMARY OF THE INVENTION

An object of the invention is to provide a high grade surface light source device suitable for mass production together with a uniform and bright illuminating light using an extremely simple construction by solving problems such as the lack of the adaptability with respect to more complicated and larger sized devices and mass production.

Another object of the invention is to provide a surface light source device having a construction of compact size and uniform thickness.

Further another object of the invention is to provide a surface light source device capable of obtaining a uniform emitting light flux which is adjusted to a desired distribution of the propagating direction.

Still another object of the invention is to provide a surface light source device in which an emitting light is adjusted to have a clear directionality as much as possible.

The invention is to arrange a light incident means on a lateral side of a light scattering conducting element, and to take out the incident light therefrom as an emitting light flux having a surface shape spread by means of a light propagating direction converting function of the light scattering conducting element. The invention is to provide various kinds of surface light source devices, which are classified as listed below depending on the pattern of the light scattering conducting element to be used.

[1] Surface Light Source Device using Light Scattering Conducting Element having a Plurality of Light Scattering Conducting Block Regions A light scattering conducting element used in this pattern, in order to form a plate shape as a whole, has at least two light scattering conducting block regions Γi (where i=1, 2, . . . , and hereinafter referred to simply as "block region") each having a complementary shape to the other. Each block region is given a light scattering power by being formed through a kneading process of at least two materials having a different refractive index from the other.

At least one of the effective scattering irradiation parameter values Ei (i=1, 2, . . . ) is selected so that the value is not equal to any other effective scattering irradiation parameter values, where Ei (i=1, 2, . . . ) represents an effective scattering irradiation parameter designating a scattering power of each block region Γi.

An alignment of each block is selected so that an average value Eav of the effective scattering irradiation parameter in sectional view in a thickness direction of a plate shaped light scattering conducting element, is relatively smaller adjacent to the light incident means, and is relatively larger apart from the light incident means.

At least one light incident means is arranged on a lateral-side of the plate shaped light scattering conducting element satisfying the condition as described above.

A preferable value of the effective scattering irradiation parameter El (i=1, 2, . . . ) of each block region may be within a range of $$0.0001 \ [cm^{-1}] \leq Ei \leq 1000 \ [cm^{-1}].$$

A range of a correlation distance ai, when a correlation function $\gamma i(r)$ of a refractive index ununiform structure producing the scattering power in each block region Γi is expressed by an approximate formula $\gamma i(r)=\exp[-r/ai]$ (where "r" represents a distance between two points, each being within the light scattering conducting block region Γi), may preferably be under the condition of $0.005 \ \mu m \leq ai \leq 50 \ \mu m$.

A part or a whole of the block region Γi may includes a polymer matrix, and a particle shape material dispersed and included into the polymer matrix through a forming process containing a kneading process. At that time, the material is selected so that a difference between a refractive index of the particle shaped material and a refractive index of the polymer matrix Γi is at least equal to or more than 0.001.

A part or a whole of the block region Γi may preferably be made of a material formed by a molding process including a kneading process of at least two kinds of polymers. At this time, for refractive indices of such at least two kinds of polymers, a material is selected so that a difference between a maximum refractive index and a minimum refractive index is at least equal to or more than 0.001.

A part or a whole of the block region Γi may preferably be formed by a process including an injection molding process or an extrusion molding process.

The surface light source devices having various patterns as described in above may preferably further be provided with a scattering light emitting direction correcting means for correcting the scattering light emitting direction characteristic in a manner of further facing a surface region on a light emitting-side or on a opposite-side thereto. The light emitting direction correcting means may be arranged as another light emitting direction correcting means independent from the light scattering conducting element. The light emitting direction correcting means may preferably be provided unitary with the light scattering conducting element.

[2] Surface Light Source Device Using Light Scattering Conducting Element Combining Light Scattering Block Region and Transparent Light Conducting Region A light scattering conducting element used in this pattern has a light scattering conducting block and a transparent light conducting region. The light scattering conducting block region is formed by a light diffusion plate, and the transparent light conducting region is formed by a transparent plate. These light diffusion plates are laminated with transparent plates, and made to the light scattering conducting elements. Then in the arrangement, the light diffusion plate is positioned on an adjacent-side (light emitting-side) to an object to be illuminated, and the transparent plate is positioned on an apart-side (opposite-side to the light emitting-side) from the object to be illuminated.

A rod shaped light source is arranged along one end surface of the light scattering conducting element, and a reflector is provided on a back surface-side (a surface side which does not face the light diffusion plate) of the transparent plate.

The light diffusion plate arranged on the adjacent-side of the object to be illuminated has a shape whose thickness gradually increases with traveling of the light, and the transparent plate arranged on the apart-side from the object to be illuminated has a shape whose thickness decreases with traveling of the light.

In such surface light source device, a light emitted from the light source is mainly incident on an opalescent substrate through the transparent substrate, where the resultant light is scattered and thereafter is emitted directly from a surface at an adjacent-side from the object to be illuminated. Such optional light path passes only at one time through a boundary surface between the light diffusion plate and the transparent substrate, thereby light loss is relatively reduced advantageously.

A rod shaped light source may preferably be arranged along two end surfaces opposing each other in the light scattering conducting element, where the light diffusion plate which is arranged in the adjacent-side to the object to be illuminated has a shape whose thickness increases gradually toward a center with traveling of the light, and the transparent plate arranged in the apart-side from the object to be illuminated decreases gradually toward the center with traveling of the light.

A means for correcting a traveling direction of the incident light on the light diffusion plate may preferably be inserted between the light diffusion plate and the transparent plate. The transparent plate may preferably employ a structure where transparent substrates are laminated.

The light diffusion plate may preferably have a refractive index ununiform structure produced by a polymerization process of at least one kind of organic material. For the light diffusion plate, there may preferably be used a polymer matrix, and one in which the particle material is diffused and contained in the polymer matrix through a molding process containing a kneading process. In this arrangement, a material is selected so that a difference of refractive index between the particle shaped material and the polymer matrix is at least equal to or more than 0.001.

In addition, there may preferably be employed a light diffusion plate made of material formed by molding process containing a kneading process of at least two kinds of polymers, where, for the at least two kinds of polymer refractive indices, a material is selected so that a difference between the maximum refractive index and the minimum refractive index is at least equal to or more than 0.001.

To manufacture the light diffusion plate there may preferably be employed a process containing the injection molding process or the extrusion molding process.

A value of the effective scattering irradiation parameter E expressing a scattering power of the light diffusion plate may preferably be within a range 0.0001 [cm$^{-1}$]$\leq Ei \leq$1000 [cm$^{-1}$].

A correlation distance ai, when a correlation function $\gamma i(r)$ of a refractive index ununiform structure producing the scattering power is expressed by an approximate formula $\gamma i(r) = \exp[-r/ai]$ (where "r" represents a distance between two points within the light scattering plate), may preferably be within a range 0.005 $\mu$m$\leq$ai$\leq$50 $\mu$m.

[3] Surface Light Source Device Using Wedge Shape Directionality Emitting Light Scattering Conducting Element and Wedge Shape Emitting Direction Characteristic Adjusting Element A light scattering conducting element used in this pattern contains a volume region having a wedge shape sectional view, and a directionally emitting characteristic. A scattering power in the volume region is of uniformity, a value of the effective scattering irradiation parameter E[cm$^{-1}$] is within 0.5$\leq$E$\leq$50. A correlation distance a[$\mu$m], when a correlation function $\gamma(r)$ of a refractive index ununiform structure producing the scattering power is expressed by an approximate equation $\gamma(r) = \exp[-r/a]$ (where "r" represents a distance between two points within the light scattering plate), is made within a range 0.06$\leq$a$\leq$35.

The wedge shape emitting direction characteristic adjusting element, placing a smaller interval between the light scattering conducting element and the light output surface, is positioned with a complementary positional relationship with the light scattering conducting element. The light incident means is arranged on an end surface-side of a relatively larger-side of a sectional area of a wedge shape sectional view of the light scattering conducting element.

The wedge shape emitting direction characteristic adjusting element is formed of the light scattering conducting element having a smaller effective scattering irradiation parameter E than the light scattering conducting element.

A prism shaped irregularity for a light emitting direction correction is formed on either one or both of a light input surface of the wedge shape emitting direction characteristic adjusting element opposing the light output surface of the light scattering conducting element or/and the output surface of an opposite side to the light input surface.

In the case where the prism shaped irregularity for the light emitting direction correction is formed on both of, the light input surface of the wedge shape emitting direction characteristic adjusting element opposing to the light output surface of the light scattering conducting element, and the light output surface on an opposing-side to the light input surface, then one-side alignment direction within both prism shaped irregularity lines may preferably be selected along a longitudinal direction viewed from the light input surface-side of the light scattering conducting element. Another-side alignment direction may preferably be selected along a transverse direction viewed from the light input surface-side of the light scattering conducting element.

The wedge shape emitting direction characteristic adjusting element may preferably be formed of transparent optical material, and this corresponds to the wedge shape emitting direction characteristic adjusting element whose effective scattering irradiation parameter E is substantially made to "0". In this arrangement, an emitting directionality possessed by the light scattering conducting element is maintained at a most satisfactory condition.

The following explanation referring to Debye theory is respectively for the light scattering conducting element (including the light diffusion plate) used in various patterns of surface light source devices, or for the effective scattering irradiation parameter describing the scattering power of the wedge shape emitting direction characteristic adjusting element, and for a correlation distance of a value closely relating to the emitting directionality of the light scattering conducting element, respectively as formerly described.

A light with an intensity 10 transmits by "y" (cm) through a medium, the scattering therein provides attenuation of the light into an intensity I, where an effective scattering irradiation parameter E is defined as the equations (1) or (2).

$$E[cm^{-1}] = -[1n(I/I0)]/y \qquad (1)$$

$$E[cm^{-1}] = -(1/I) \cdot dI/dy \qquad (2)$$

The equations (1) and (2) are expressions of so called integration and differential, and a physical meaning is approximate. E is sometime called a durbidometric.

On the other hand, an intensity of the scattering light in case of arising the light scattering by an ununiform structure distributed into the medium is expressed by the following equation (3) when most of emitting light is a vertical polarized light for the vertical polarity of incident 00 light, (Vv scattering).

$$Vv = [(4 < \eta^2 > \pi^3)/\lambda_0^4] C\gamma(r) dr \qquad (3)$$

where $$C = [r^2 \sin(vsr)]/vsr^\infty \qquad (4)$$

When the natural light is incident, it is known that, in consideration of Hh scattering light, the following equation (5) is obtained in that $(1+\cos^2\Phi)/2$ is multiplied on a right edge of the equation (3).

$$Ivh = Vv(1+\cos^2\Phi)/2 \qquad (5)$$

where $\lambda_0$ represents a wavelength of incident light, n=(2 $\pi$n)/$\lambda_0$, s=2sin($\Phi$/2). "n" represents a refractive index of the medium, f represents a scattering angle, <72$^2$> expresses a dielectric constant fluctuation root-mean square (hereinafter referred to as $<\eta^2>+\tau$, and $\tau$ is suitably used), and a correlation function called $\gamma(r)$ is expressed by the following equation (6).

$$\gamma(r) + \exp(-r/a) \tag{6}$$

According to Debye, when the refractive index ununiformity structure of the medium has a boundary surface and is diffused separating into A phase and B phase, the following equations (7) and (8) are established for a relationship among the correlation function ν(r), a correlation distance "a", and a dielectric fluctuation root-mean square τ.

$$a[\text{cm}] = (4V/s)\phi A \phi B \tag{7}$$

$$\gamma = \phi A \phi B (nA^2 - nB^2)^2 \tag{8}$$

where V represents an entire volume, S an entire area of a boundary surface, φA φB a volume percentage of each phase A and B, and nA and nB a refractive index of each phase A and B.

Considering that the ununiform structure is formed on a sphere shaped boundary surface of a radius R, a correlation distance "a" is expressed by the following equation (9).

$$a[\text{cm}] = (4/3)R(1-\phi A) \tag{9}$$

Using the equation (6) relating to a correlation function γ(r), an effective scattering irradiation parameter E, at the time that the natural light is incident in accordance with the equation (5), is calculated to produce the following result.

$$E = [(32a^3 \tau \pi^4)/\lambda_0^4] \cdot f(b) \tag{10}$$

where;

$$f(b) = [(b+2)^2/b^2(b+1) - \{2(b+2)/b^3\} \cdot 1n(b+1)] \tag{11}$$

$$b = 4v^2 a^2 \tag{12}$$

With reference to the relationship as hereinbefore described, it is understood that the control of an intensity of the scattering light, an angle dependency of the scattering light intensity, and an effective scattering irradiation parameter E becomes possible by changing the correlation distance "a" and the dielectric constant fluctuation root-mean square τ.

FIG. 1 is a characteristic curve showing a condition for making the effective scattering ir radiation parameter E constant in the case of $$E=50 \text{ [cm}^{-1}\text{] and } E=100 \text{ [cm}^{-1}\text{]}$$

where the x-axis expresses correlation distance "a", and the y-axis expresses dielectric constant fluctuation root-mean square τ.

In general, a larger E provides a larger scattering power, and a smaller E provides a smaller scattering power, in other words, thus approximating transparency. In an ideal transparent part (no-scattering), E=0 is satisfied.

Accordingly, as a general tendency, the surface light source device with a larger dimension uses a light scattering conducting element with smaller E, and the surface light source device with a smaller dimension suitably uses a light scattering conducting element with larger E.

The scattering power given for the wedge shape emitting direction characteristic adjusting element is provided for mainly exhibiting an adjusting operation to suitably widen an emitting light flux, therefore the effective scattering irradiation parameter E value is selected so as to be smaller compared to the light scattering conducting element which is used as combined.

On the other hand, the correlation distance "a" is a value deeply related to a directionality characteristic of the scattering light in an individual scattering phenomena within the light scattering conducting elements. As estimated from the forms of the equations (3) and (5), the light scattering in the light scattering conducting element generally tends to have a forward scattering property, whose intensity varies depending on the correlation distance 11 all.

FIG. 2 is a graphical representation exemplifying a case of two values of "a". In the drawing, x-axis expresses scattering angle Φ (a traveling direction of incident light is made Φ=0°), y-axis a normalized scattering light intensity in the case of assuming natural light, expressing a value Vvh (Φ)/Vvh (0) normalized from the equation (5) for Φ=0°.

As together listed in the drawing, a graph showing a relaxed reduction function in relation to Φ is obtained in the case of a=0.13 μm, i.e., 2R=0.2 μm by a particle size converted value by the equation (9), and a graph showing a sudden reduction function in relation to φ in its smaller value region in the case of a=1.3 μm, i.e., 2R=2.0 μm at a particle size conversion value by the equation (9).

In this way, the scattering produced by the refractive index ununiform structure within the light scattering conducting element has basically a property of forward scattering, however, the smaller value of the correlation distance "a" provides a weak forward scattering, with a tendency to widen a range of a scattering angle in the individual scattering process. This has been confirmed by experimentation.

The argument described above is produced by looking at the scattering phenomena itself by the refractive index ununiform structure distributed in the light scattering conducting element. However, to evaluate a directionality characteristic of the light actually emitted from the light output surface of the light scattering conducting element, there must be considered a phenomenon of total reflection in the light output surface and a transparency at the time of light emitting (a rate of escape from the light scattering conducting element to outside the element).

In consideration of the condition of total reflection by basic optics theory, in the case where the light is incident on the light output surface from the inner-side of the light scattering conducting element and a critical angle αc (where a normal axis direction established on the light output surface is assumed as 0°) determined by a refractive index of the medium inside and outside the light scattering conducting element exceeds an incident angle, here then, emission (escape) externally (air layer) does not arise. The typical material PMMA (a refractive index 1.492) preferably used in the invention has αc=42°.

As described later, a refractive index in a range of 1.4 to 1.7 is given for a good amount of resin material suitable as a matrix material of the light scattering conducting element according to the invention, and thus a practical value of αc is in a range of 36.0° to 45.6°.

As described above, the scattering within the light scattering conducting element exhibits a forward scattering property, hence when a side end-surface of the light scattering conducting element is made a light incident surface, it is considered as a rare case that the light incident from the light incident surface meets with the ununiform structure to produce a primary scattering light which immediately satisfies the critical angle condition described above.

Therefore, the light emission from the light output surface of the light scattering conducting element, largely relates to a multiplex scattering process in the inner-side of the light scattering conducting element, or to a phenomenon that the light that has traveled through a reflection process by the boundary surface or reflector on a back surface-side of the light scattering conducting element satisfies the critical angle condition emitted externally.

If such is the case, with an attention to such light satisfying the critical angle condition, the forward scattering property which is an attribute of the individual scattering phenomenon is weakened to a certain extent, and a good amount of spread must be produced in the light traveling direction distribution. As a result, a directionality characteristic of the light emitted from the light scattering conducting element formed of the light scattering conducting elements largely comes to depend on an angle dependency of a transparency (an escaping factor) in the light output surface of the light satisfying the critical angle condition.

In general, a boundary surface transparency of the light incident on a medium boundary surface with an incident angle as satisfying the critical angle condition at a most limited condition, is extremely low. For example, in the case of a boundary face between acrylic resin and the air, a P polarized component is equal to an extent of 40%, and an S polarized component is equal to an extent of 20%. With the increase of an angle by which an incident angle is decreased from the critical angle, then a light transmissivity (escaping coefficient) is rapidly increased, and when decreased by equal to or more than 5° to 10°, it becomes substantially constant. In the case of the boundary face between the acrylic resin and the air, that of a P polarized light component is equal to or more than 90%, and that of an S polarized light component is equal to or more than 85%.

From these phenomena, arguing the acrylic resin case, the light with an incident angle of about 35° to 40° to the light output surface is considered to most largely contribute to the light emission from the light output surface of the light scattering conducting element. Now considering Snell's law, when the light output surface is a boundary face between the acrylic resin and the air, a light incident on the light output surface with an incident angle of about 35° to 40° is emitted in a direction where resultantly the emitted light travels and enters into a range of an extent of several degrees more or less than about 65° for a normal line erected on the light output surface from the air-side.

When a material other than acrylic resin is used for the light scattering conducting elements, a refractive index of an actual material is in a range of about 1.4 to 1.7, thus if a shift of extent of several degrees is estimated for the angle as formerly described, entirely the same argument appears.

That is to say, an emitting light from the light output surface of the light scattering conducting element comes, by roughly estimating, to have a directionality in a direction rising more or less by 20° to 30° for the light output surface.

Here, it is however noted that too small of a value of correlation distance "a" provides a weakened forward scattering property in the individual scattering process, and generates the scattering light with a larger range including a backward scattering only by the primary scattering, and a prior condition giving such directionality is broken. The invention may preferably use the light scattering conducting element capable of preventing a noted phenomenon of such (that is "light scattering conducting element with an emitting directionality"). A lower limit of the correlation distance "a" giving an emitting directionality to the light scattering conducting element is equal to an extent of 0.06 µm.

In consideration of this condition, one practical range which gives the light scattering conducting element with the emitting directionality, is equal to an extent of 0.06 µm to 35 µm. In the case of diffusing particles having different refractive indices to the light scattering conducting element, a range of particle size of 0.1 µm to 54 µm corresponds in accordance with the equation (9).

In such condition, a light from a source such as an ordinary fluorescent lamp (generally, a light supply means) is incident on a lateral surface as a light input surface on a larger thickness-side of the light scattering conducting element of a wedge shape having emitting directionality and a uniform scattering power, then a light flux with a directionality is emitted from front and back sides of the light scattering conducting element. One-side surface thereof (adjacent-side surface to an object to be illuminated) is used as a light output surface of the light scattering conducting element. The other-side surface thereof may preferably be arranged thereon suitably with a reflector and prevents diffusion of the light.

The light emitted from the light output surface of the light scattering conducting element with an emitting directionality is, as described above, mainly propagated in a direction of rising more or less at about 20° to 30° for the light output surface. When using a light scattering conducting element (a correlation distance is equal to or less than 0.06 µm) with a weakened emitting directionality, then an illuminating light is emitted over a wide angle range from the light output surface.

However, a brightness viewed from the front or a position adjacent thereto is essentially required for the surface light source devices in addition to the utilization of the backlight source of the liquid crystal display devices.

A light emitting direction correction means provided unitarily with or separate from the light scattering conducting element is used to respond to such requirement. The wedge shape emitting direction characteristic adjusting element used in combination with a comb shape light scattering conducting element is also a kind of light emitting direction correction means, but is provided simultaneously with an adjustment function relating to a range (a degree of sharpness of directionality) in a direction in which the surface light source device is brightly viewed. An intensity of the adjustment function effects through an intensity of the scattering power (a value of effective scattering irradiation parameter E) given to the light scattering conducting element.

To obtain an illuminating light having a largely relaxed emitting directionality of the light scattering conducting element, a relatively intensive scattering power is given. To obtain an illuminating light having a slightly relaxed emitting directionality, a relatively weak scattering power is given. In particular, to obtain an illuminating light maintaining an emitting directionality of the light scattering conducting element at a maximum allowable limit, then a transparent comb shape emitting direction characteristic adjusting element may preferably be utilized.

with respect to a characteristic curve showing a condition to render an effective scattering irradiation parameter E value constant where the x-axis expresses a correlation distance it a" and the y-axis expresses a dielectric fluctuation root-means square τ.

Figure 1:
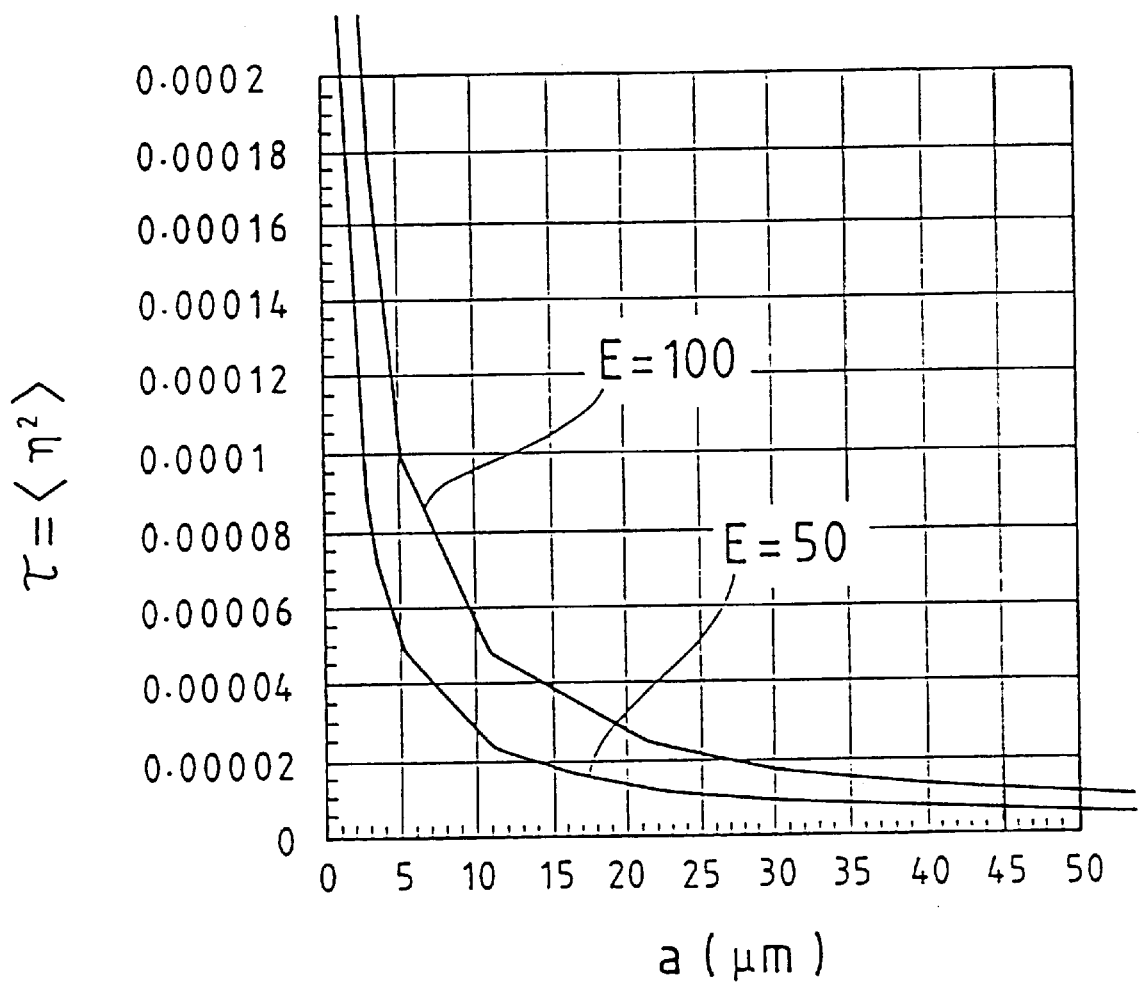
FIG. 1 is a graphical representation in the case of $$E=50 \text{ [cm}^{-1}\text{] and } E=100 \text{ [cm}^{-1}\text{]}$$
Figure 2:
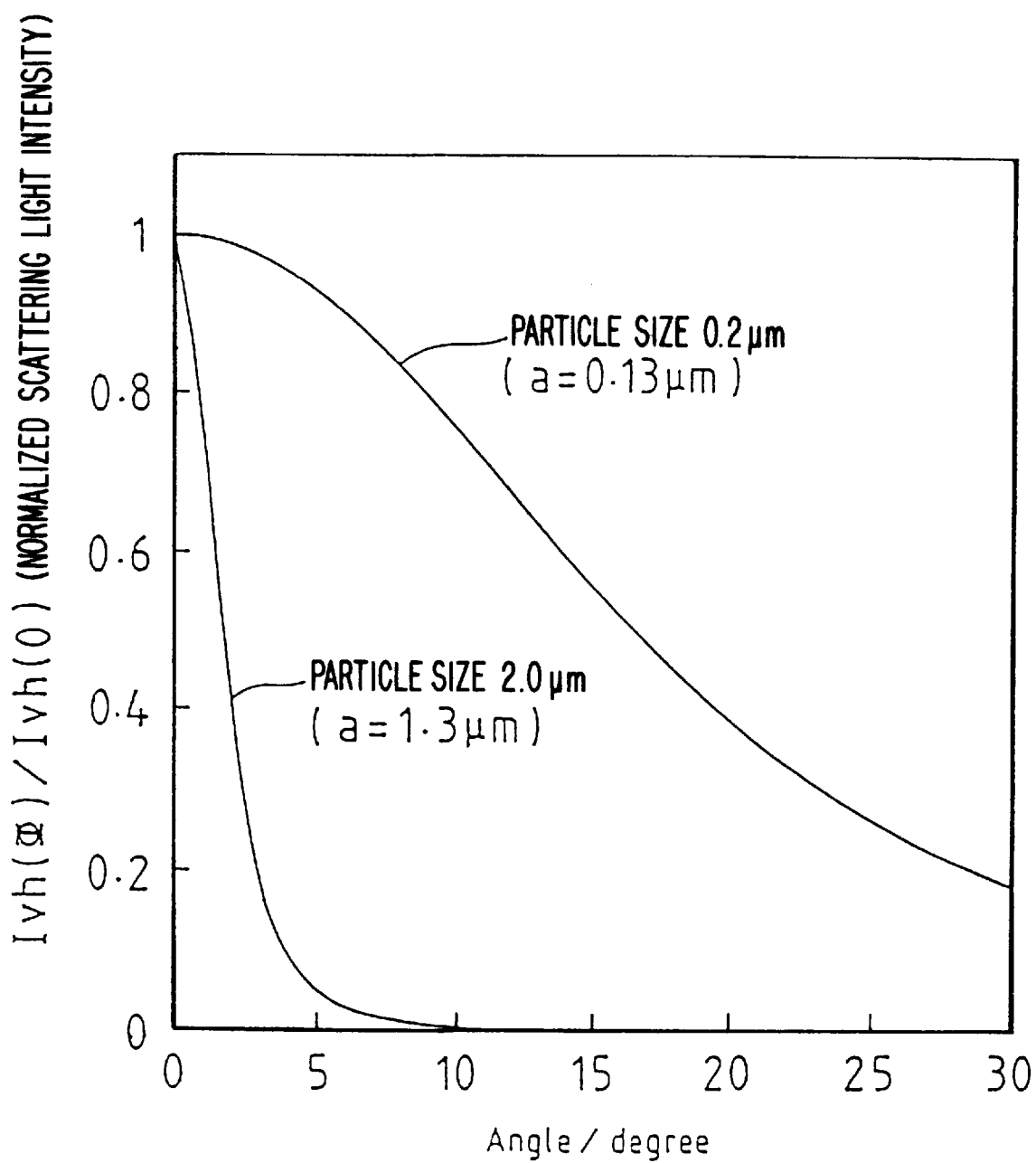
Figure 3A:
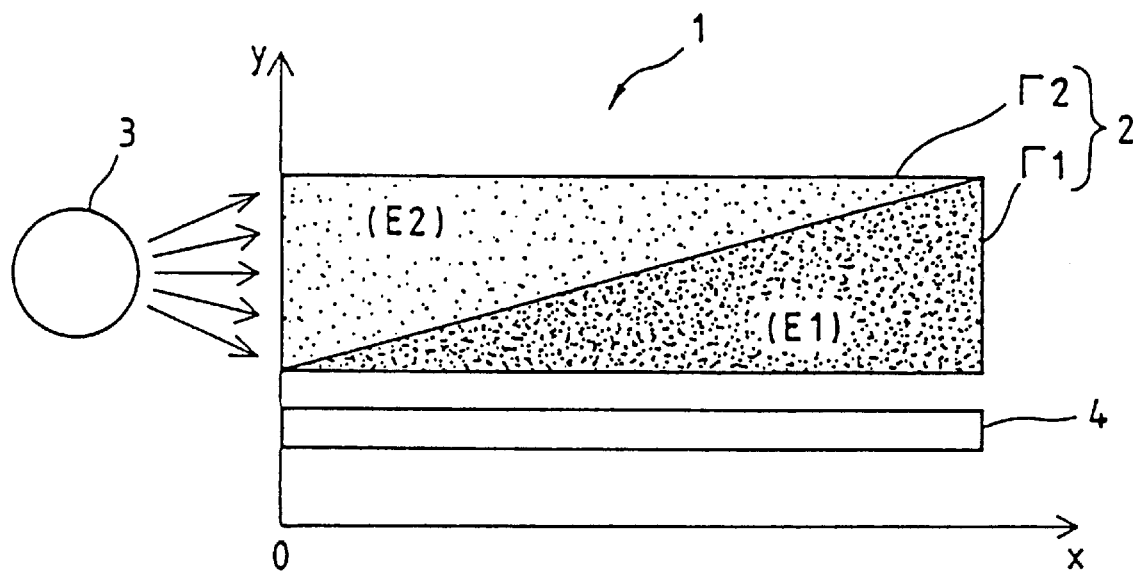
Figure 3B:
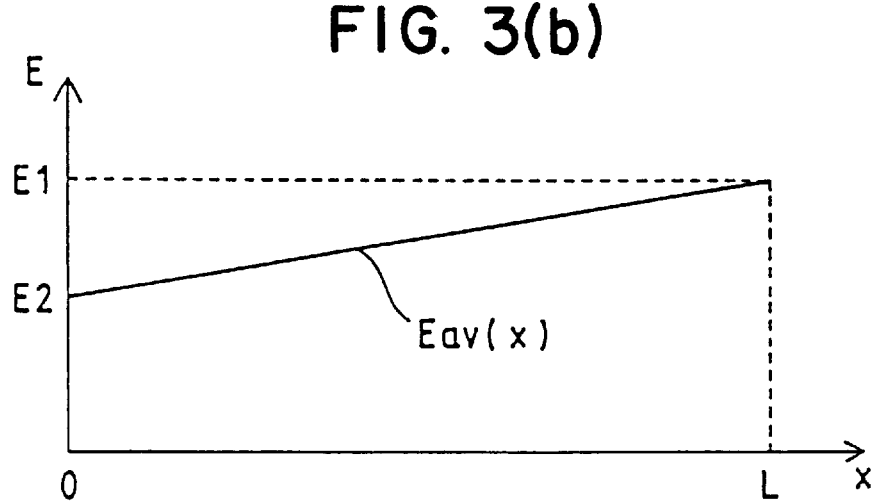
Figure 4A:
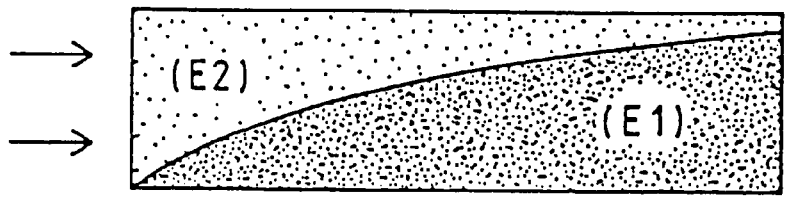
Figure 4B:
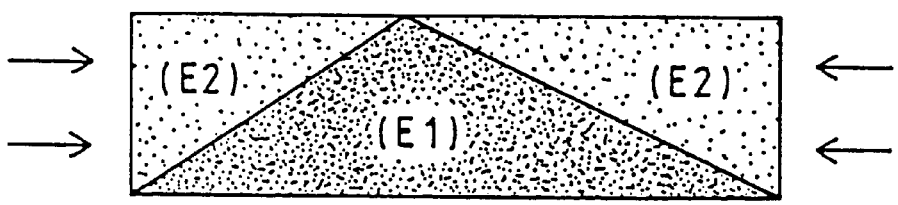
Figure 4C:
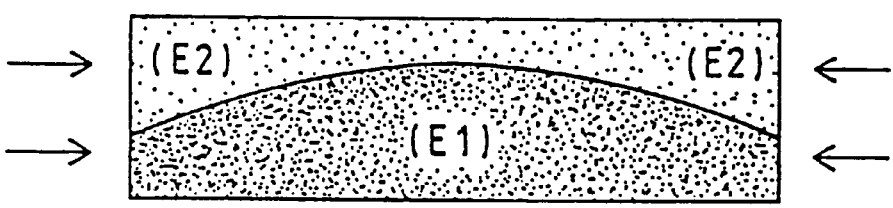
Figure 5A:
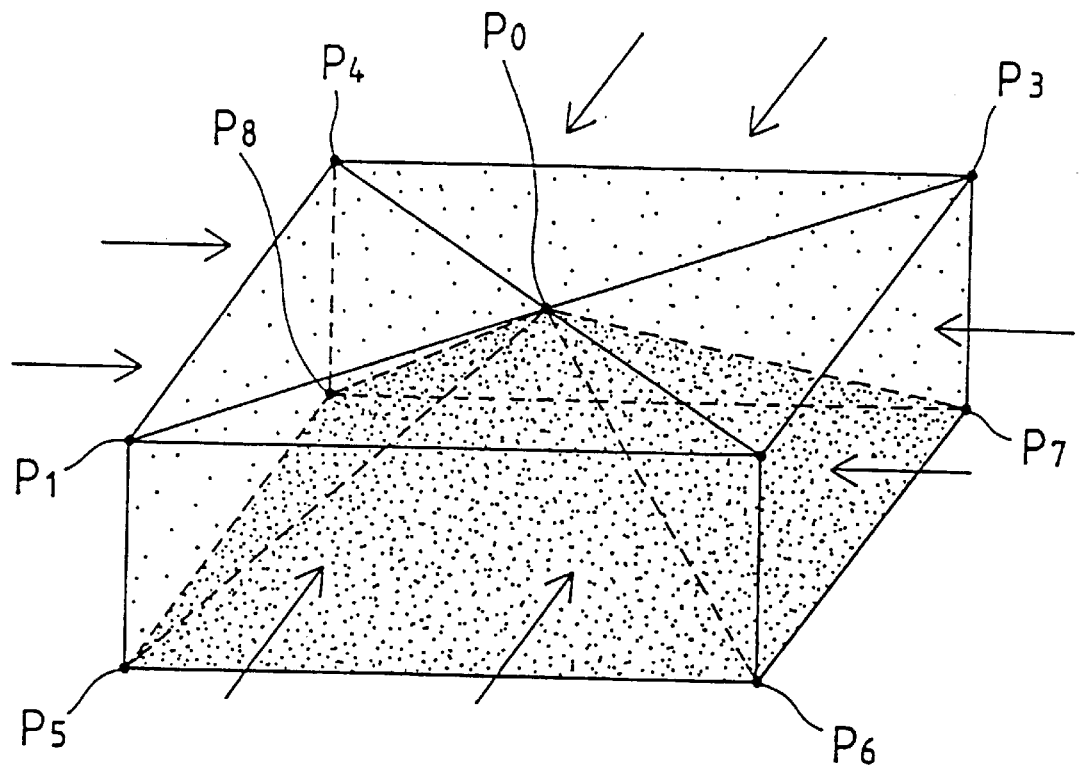
Figure 5B:
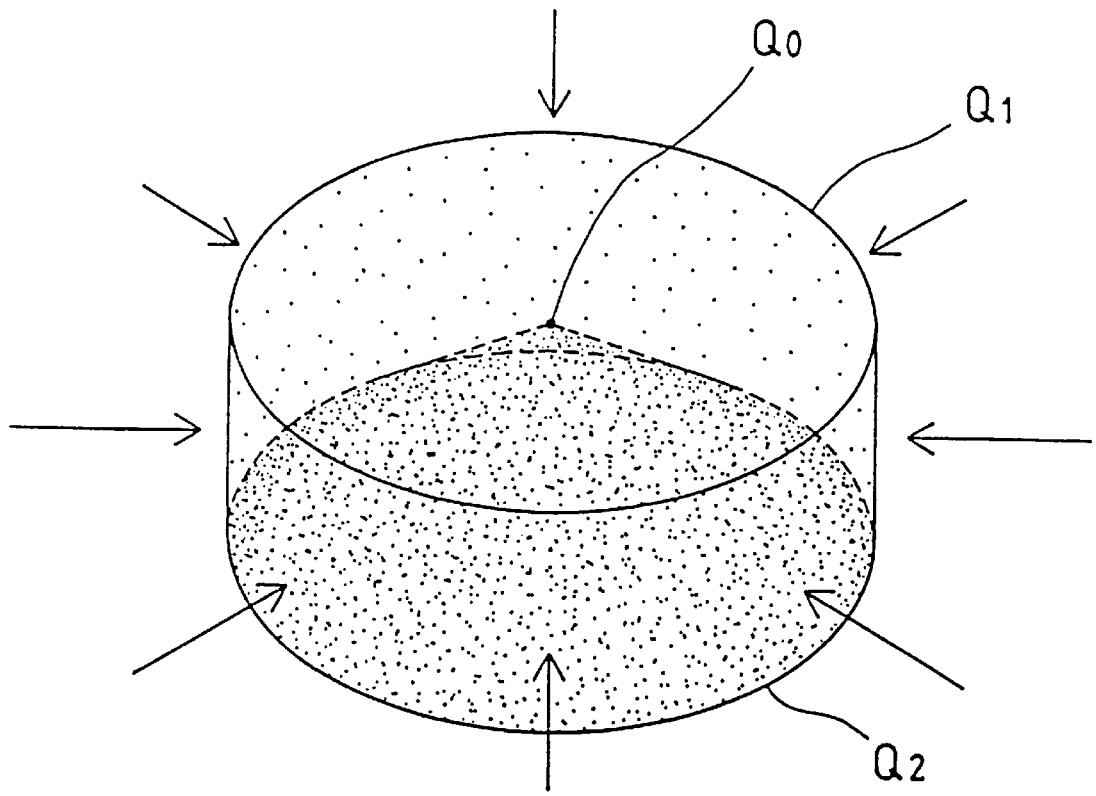
Figure 6:
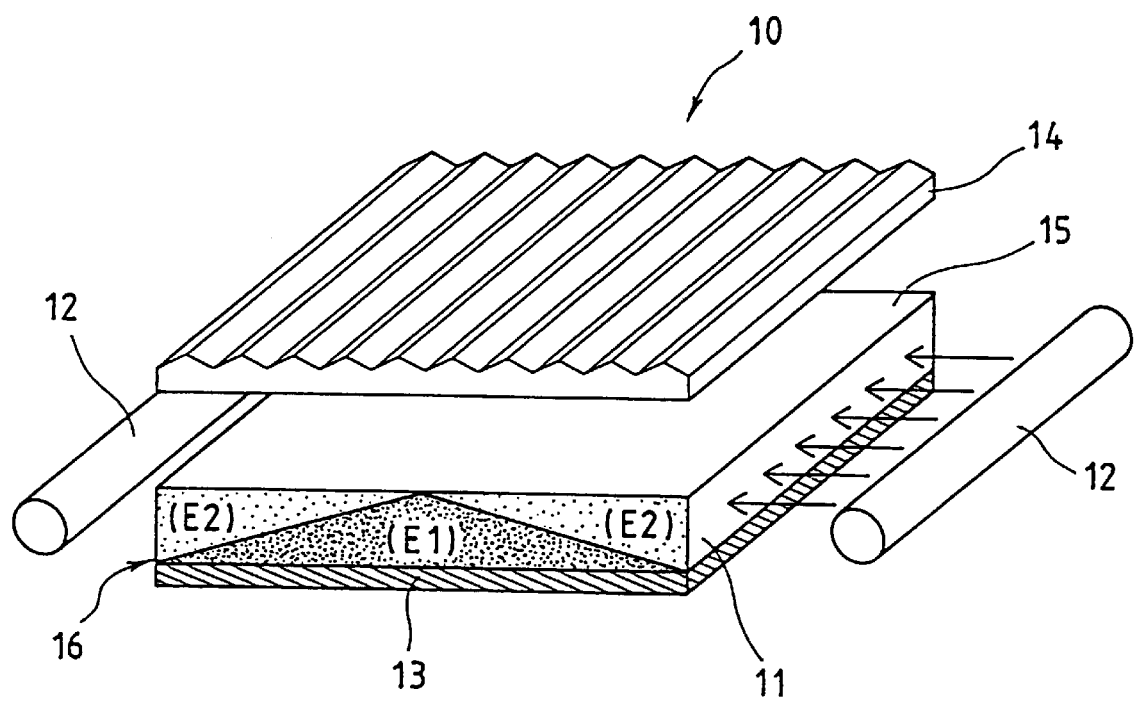
Figure 7:
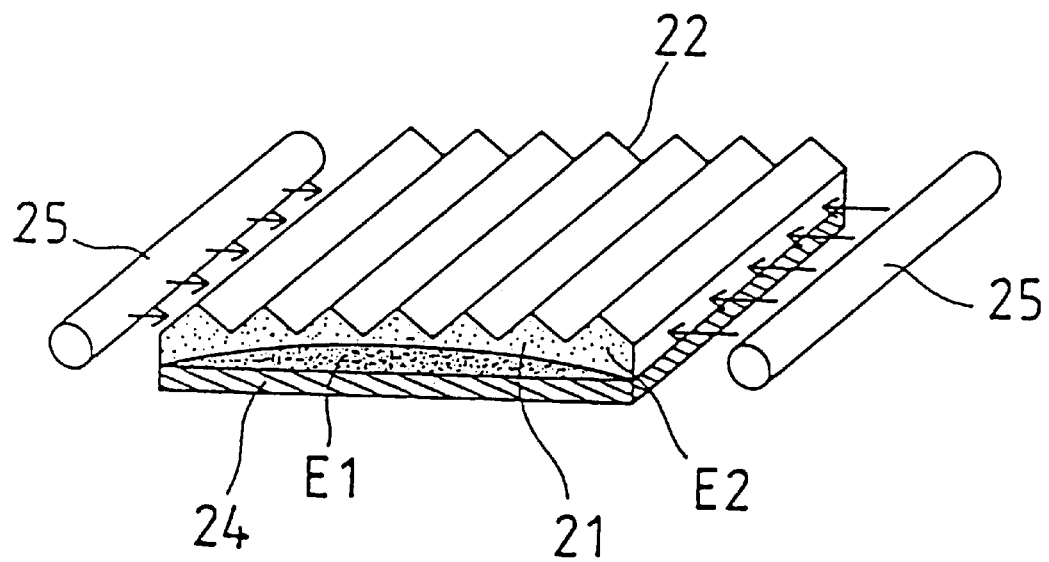
Figure 8:
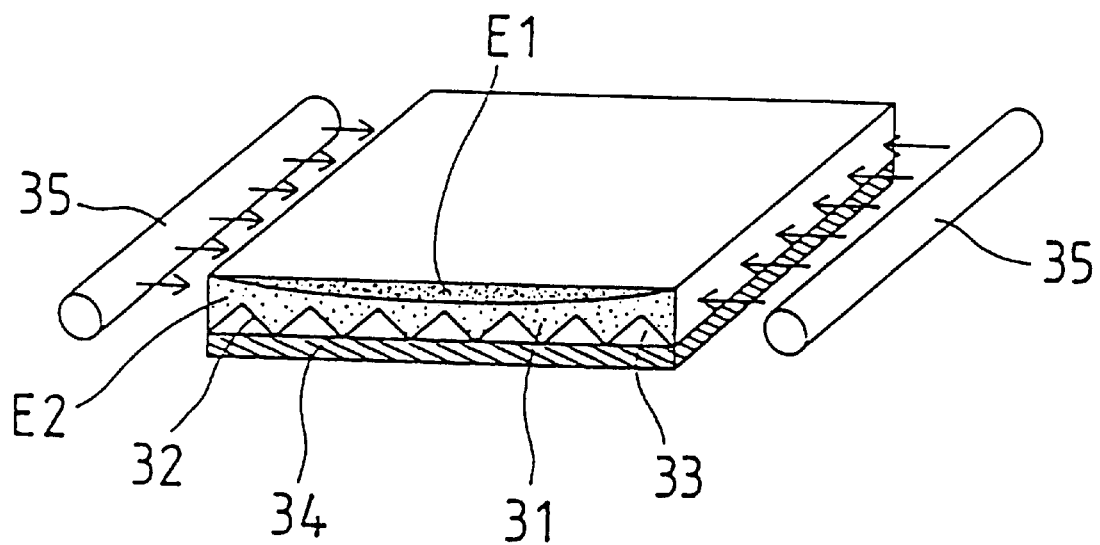
Figure 9:
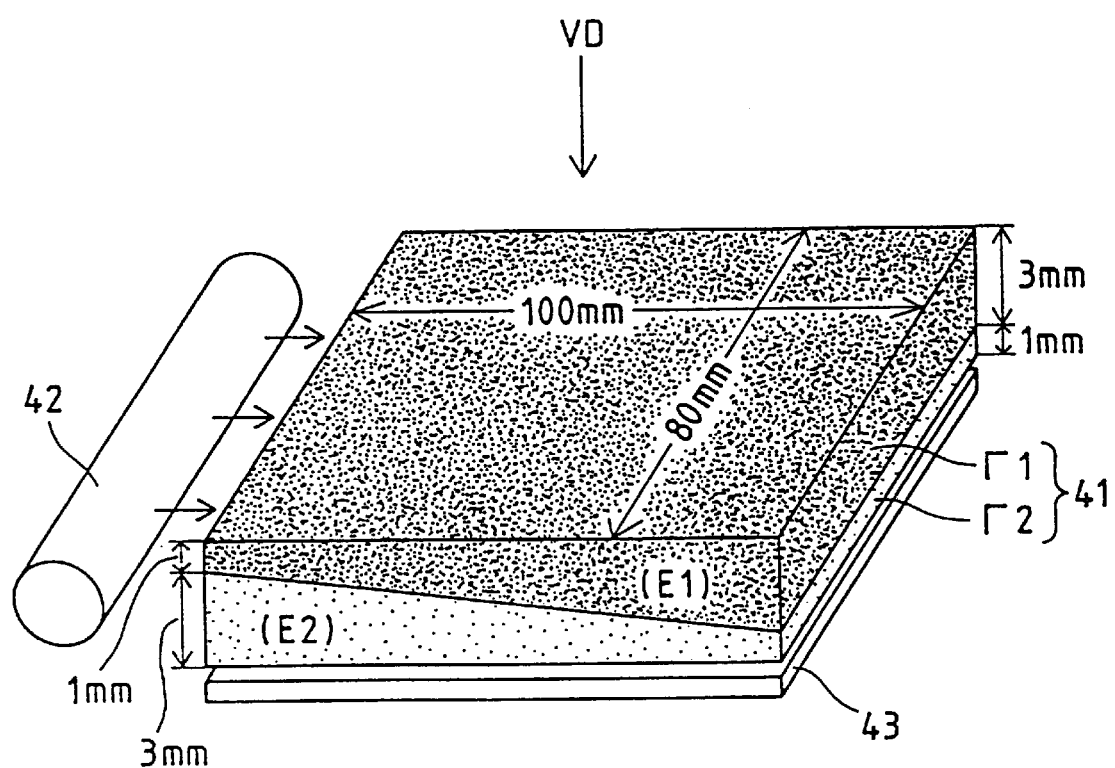
Figure 10:
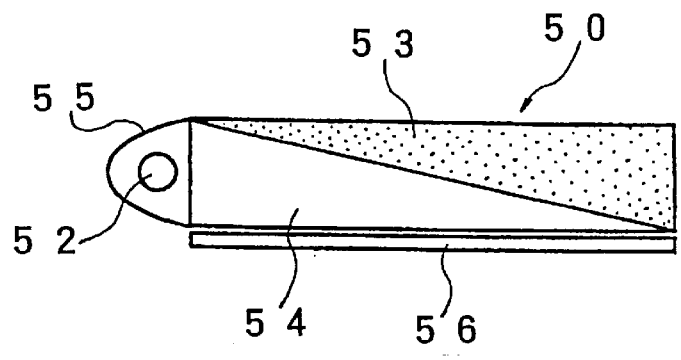
Figure 11:
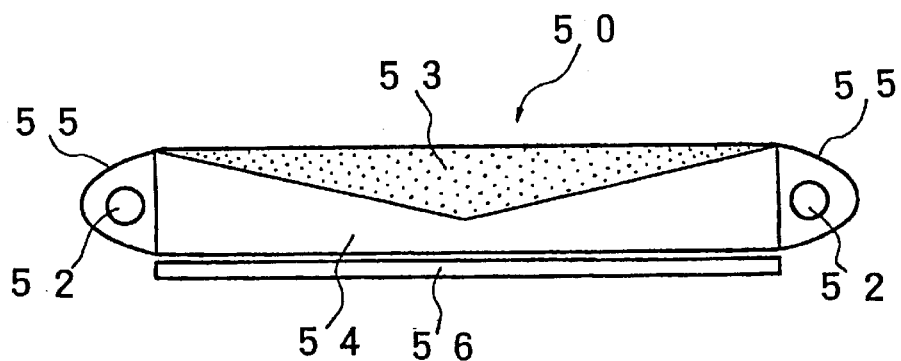
Figure 12:
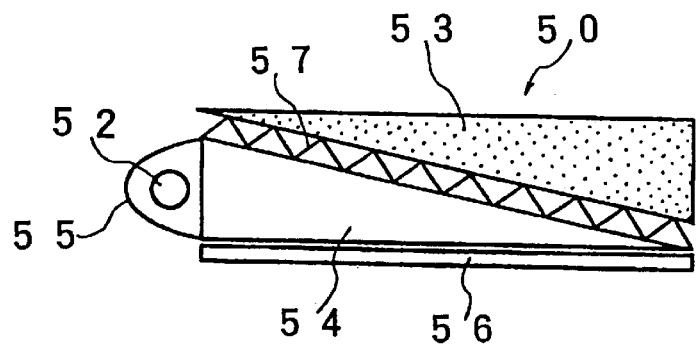
Figure 13:
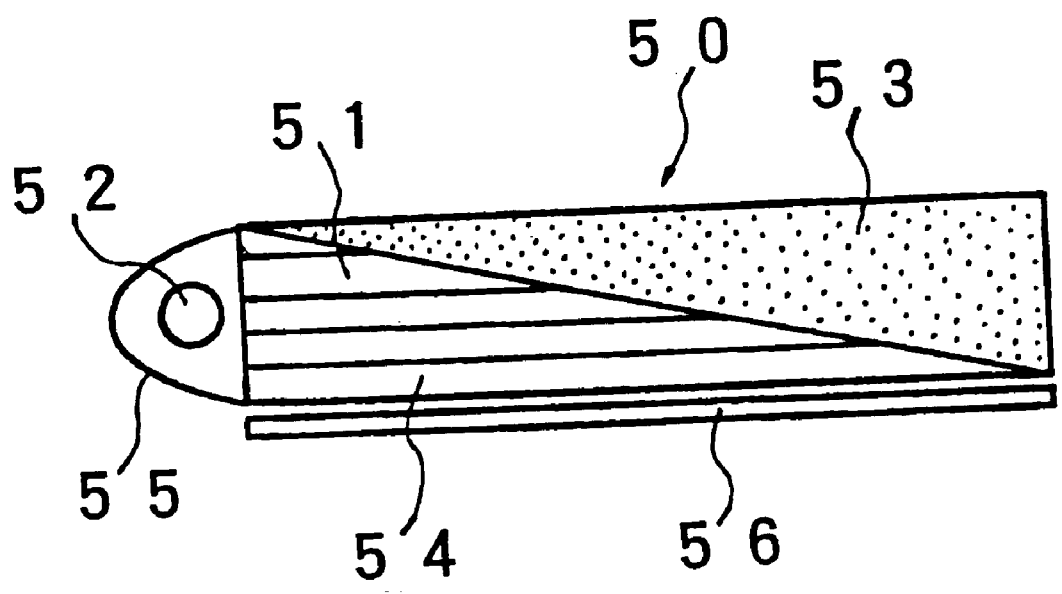
Figure 14:
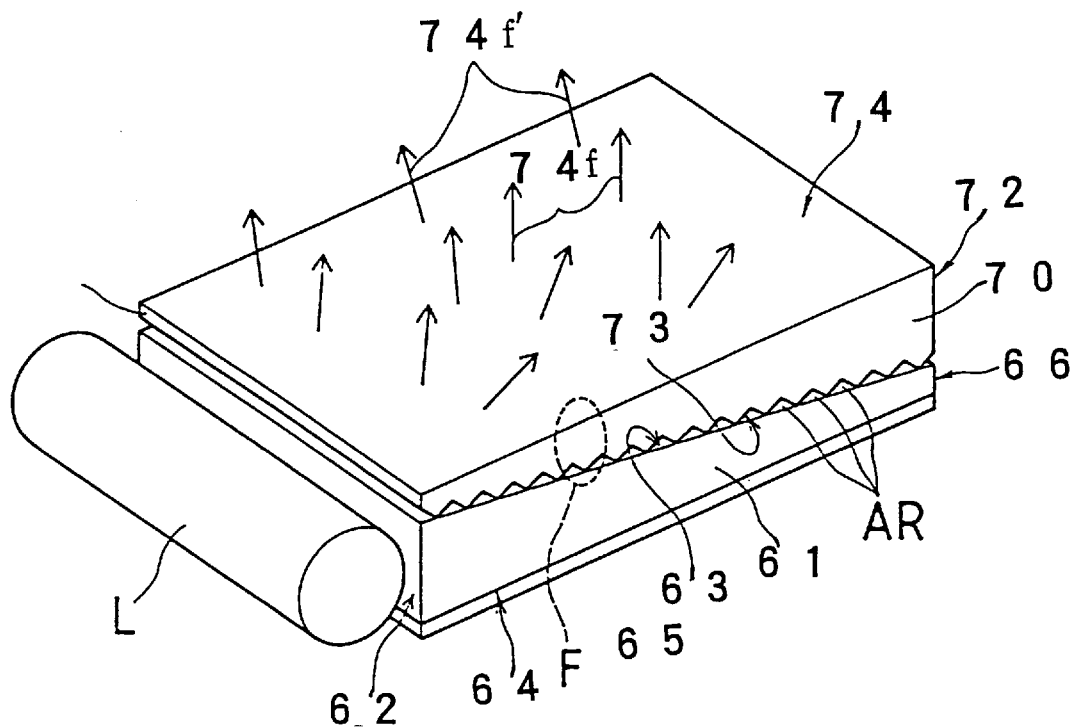
Figure 15:
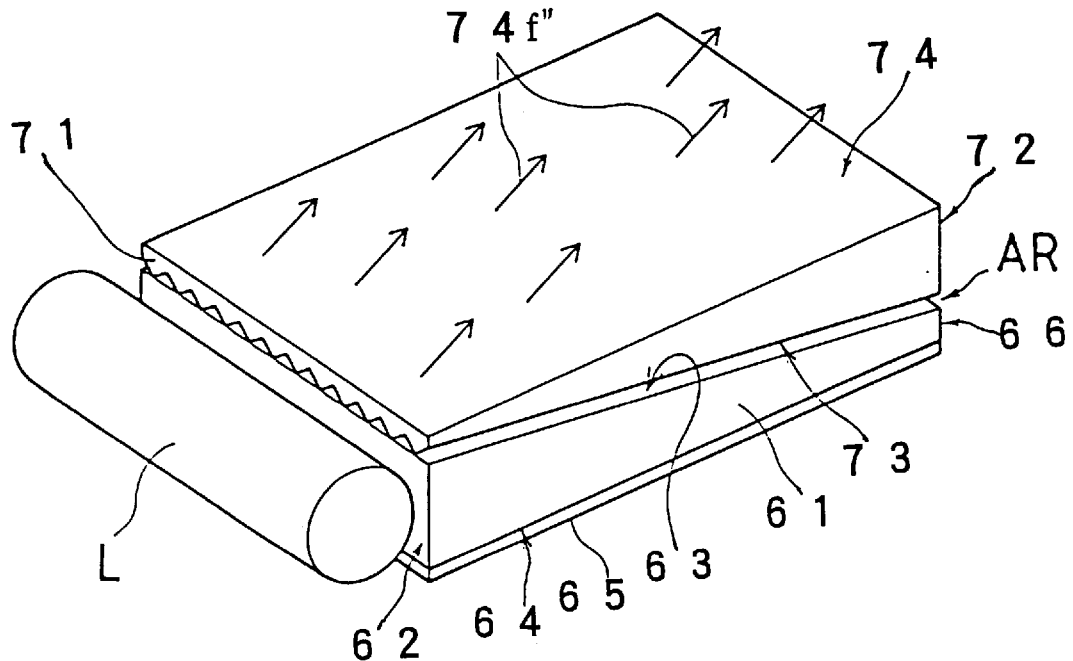
Figure 16:
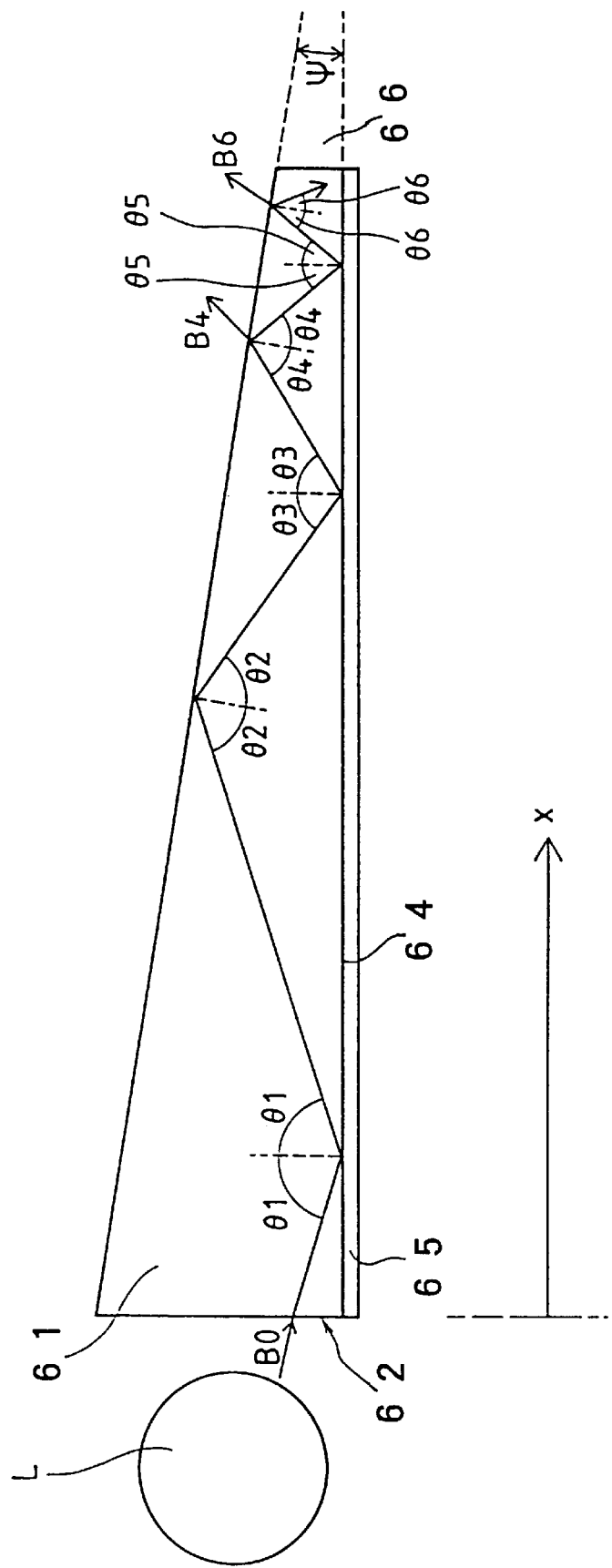
Figure 17:
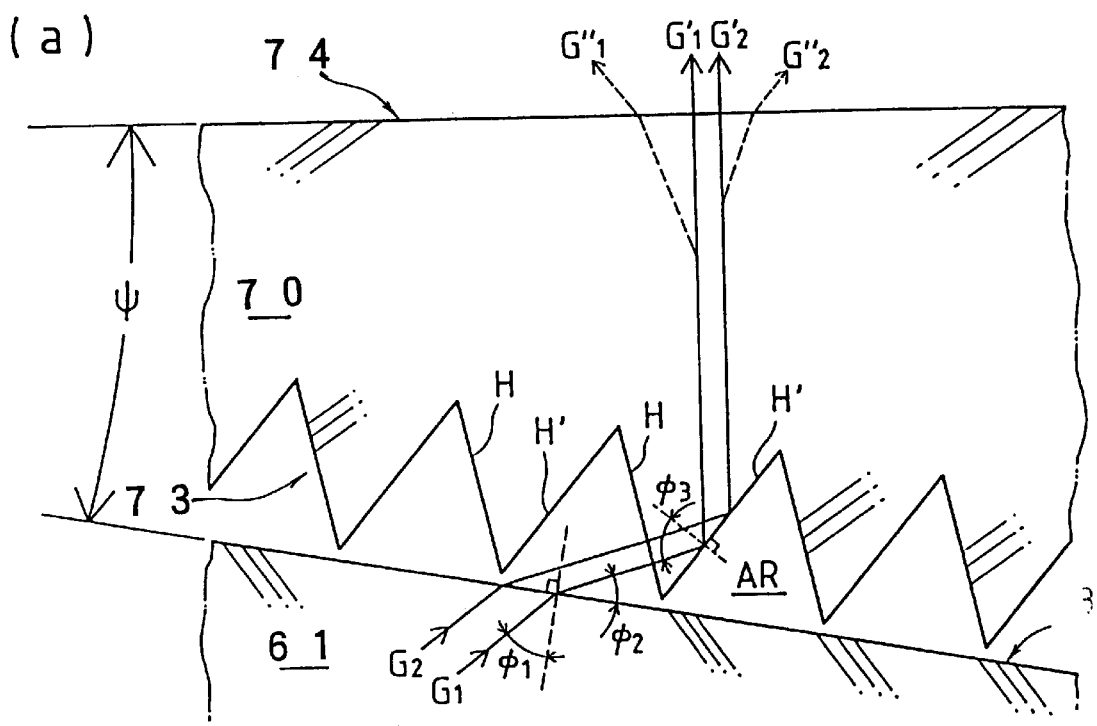
Figure 17:
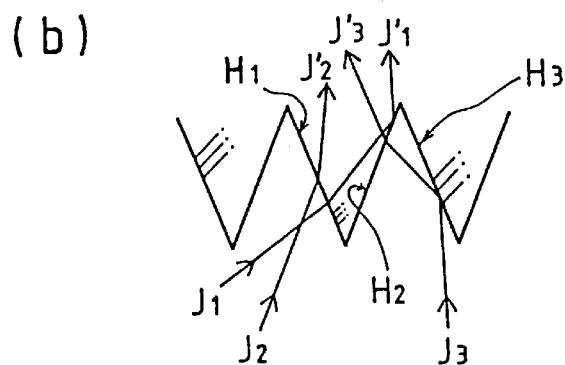
Figure 18:
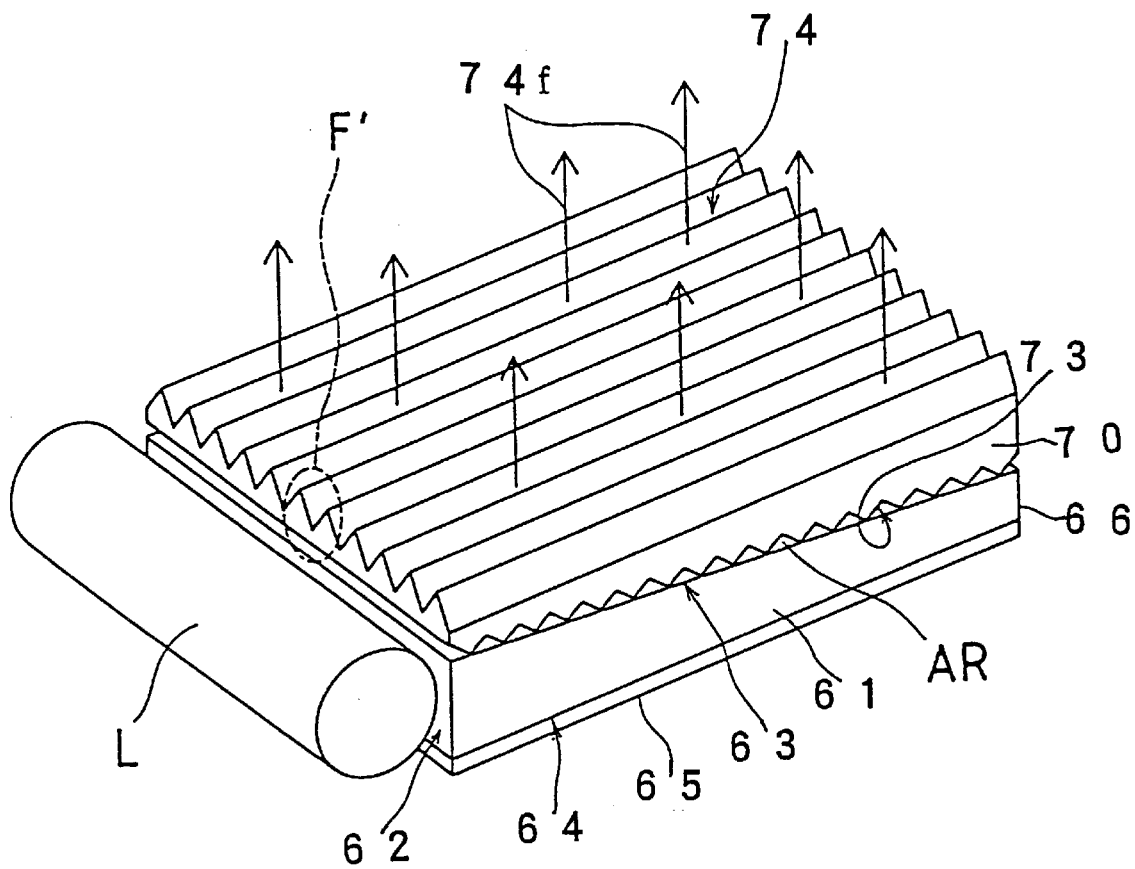
Figure 19:
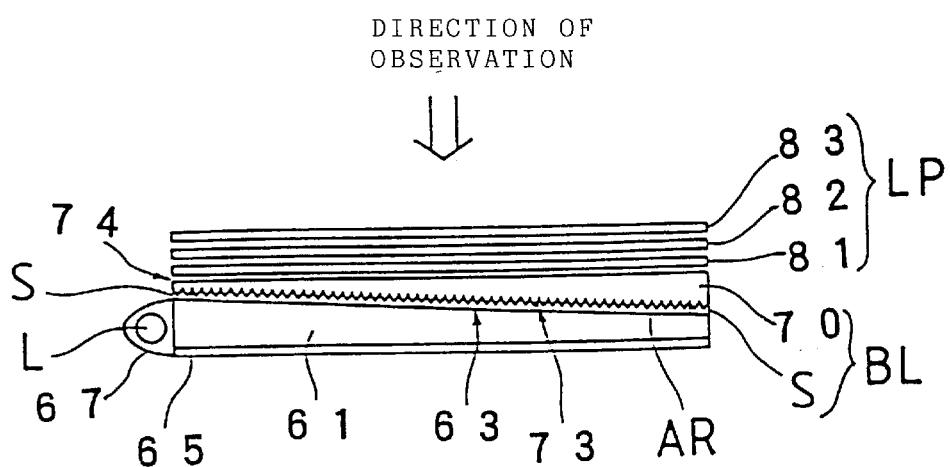

FIG. 2 is a graphical representation illustrating intensity variation of forward scattering of a light scattering conducting element depending on a correlation distance "a";

FIGS. 3(a) and 3(b) are a sectional views illustrating one embodiment of a surface light source device using a light scattering conducting element having a plurality of light scattering conducting block regions, together with a graphical representation illustrating a gradient of average value relating to a thickness direction of an effective scattering irradiation parameter;

FIGS. 4(a)–4(e) are a sectional views showing a method of combining complementary configurations of light scattering conducting block regions in embodiments of a surface light source device using a light scattering conducting element having a plurality of light scattering conducting block regions;

FIGS. 5(a) and 5(b) are a sectional views showing a method of combining complementary configurations of light scattering conducting block regions in the other embodiments of a surface light source device using a light scattering conducting element having a plurality of light scattering conducting block regions;

FIG. 6 is a perspective view illustrating an arrangement provided with a scattering light emitting direction correction element (separated) on its scattering emitting light output surface-side for the light scattering conducting element of the type in FIG. 4(b);

FIG. 7 is a perspective view illustrating an arrangement provided with a prism shaped rise and fall on a scattering emitting light output surface-side for the light scattering conducting element of the type in FIG. 4(c);

FIG. 8 is a perspective view illustrating an arrangement provided with a prism shaped rise and fall on an opposite-side surface to a scattering emitting light output surface of a light scattering conducting element;

FIG. 9 is a perspective view of an arrangement in FIG. 3(a) where dimension values are shown as an example, employing the values of the light scattering conducting element manufactured in examples <1> and <2> described below;

FIG. 10 is a sectional view illustrating a first embodiment of a surface light source device using a light scattering conducting element in combination with a light scattering conducting block region and a transparent light conducting region;

FIG. 11 is a sectional view illustrating a second embodiment of a surface light source device using a light scattering conducting element in combination with a light scattering conducting block region and a transparent-light conducting region;

FIG. 12 is a sectional view illustrating a third embodiment of a surface light source device using a light scattering conducting element in combination with a light scattering conducting block region and a transparent light conducting region;

FIG. 13 is a sectional view illustrating a fourth embodiment of a surface light source device using a light scattering conducting element in combination with a light scattering conducting block region and a transparent light conducting region;

FIG. 14 is a perspective view illustrating a first embodiment of a surface light source device using a light scattering conducting element with a comb shaped emitting directionality and a comb type emitting direction characteristic adjusting element;

FIG. 15 is a perspective view illustrating a second embodiment of a surface light source device using a light scattering conducting element with a comb shaped emitting directionality and a comb type emitting direction characteristic adjusting element;

FIG. 16 is an illustrative view showing a comb type section of a comb shaped light scattering conducting element used in the arrangement in FIG. 14, showing a repeated reflection in an inside thereof;

FIG. 17 is an illustrative view of a function of a comb type emitting direction characteristic adjusting element, where FIG. 17(a) is an enlarged view of an optical path of a representative ray in a portion designated by symbol F in FIG. 14, and FIG. 17(b) is the same in a portion designated by symbol F' in FIG. 18;

FIG. 18 is a perspective view illustrating a third embodiment of a surface light source device using a light scattering conducting element with a comb shaped emitting directionality and a comb type emitting direction characteristic adjusting element; and FIG. 19 is a sectional view of a light scattering conducting element with a comb shaped emitting directionality and a comb type emitting direction characteristic adjusting element as a backlight source of a liquid crystal display device.

DETAILED DESCRIPTION OF THE PREFERRED EMBODIMENTS

The preferred embodiments are described in detail with reference to the attached drawings. For convenience of the explanation, three items are used; namely, [1] a surface light source device using a light scattering conducting element having a plurality of light scattering conducting block regions; [2] a surface light source device using a light scattering conducting element in combination with a light scattering conducting block region and a transparent light conducting region, [3] a surface light source device using a light scattering conducting element with a wedge shaped emitting directionality and a wedge type emitting direction characteristic adjusting element.

[1] a surface light source device using a light scattering conducting element having a plurality of light scattering conducting block regions FIG. 3 shows in a sectional view a simplest structure of a surface light source device using a light scattering conducting element having a plurality of light scattering conducting block regions.

In the drawing, the surface light source device inclusively shown in the number 1 is formed of a light scattering conducting element 2, a reflector 4 provided a back surface-side (an opposite-side surface to scattering light output surface), and a light source element 3 allowing the light to be incident from a lateral-side of the light scattering conducting element 2.

The reflector 4 is provided for preventing useless diffusion of the light. Members having a surface of a mirror reflection property or a diffusion reflection property may preferably be used.

The mirror reflector 4 may preferably be unitarily provided with the light scattering conducting element 2, where it is unnecessary to form a mesh or a dot shaped pattern as in the prior art.

The light scattering conducting element 2 is formed of light scattering conducting block regions Γ1 and Γ2 having two shapes complementary to each other, where a material satisfying E1>E2 with respect to values of the effective scattering irradiation parameters E1 and E2 express the scattering power of each block region.

As shown by the graphical representation in FIG. 3(b), x-axis and y-axis are determined in an incident direction of each light and a thickness direction of the light scattering conducting element 2 respectively, and a side surface of the light incident end is made as a surface of x=0. An average effective scattering irradiation parameter Eav(x) in the thickness cross-sectional direction in each position x, is expressed as the following equation (13).

$$E_{av}(x) = E2 + [(E1-E2)/L]x \quad (13)$$

where L represents a length measured along a light incident direction of a light scattering conducting element 2 (hereinafter referred to simply as "a length" of a light scattering conducting element). With the relationship of E1>E2 being established, Eav value is gradually increased moving away from the light incident-side of the light scattering conducting element 2.

On the other hand, the light incident from a side surface of x=0 is attenuated, as traveling in x-axis direction while repeating the scattering, because of the emitting scattering light from the scattering light output surface (upper surface) or absorption loss in the inside of the light scattering conducting element body or on a surface of the reflector 4.

For this reason, a light energy density ρ(x) in a position x within the light scattering conducting element decreases together with value x. An intensity of the scattering light emitted from the position x on a surface of the light scattering conducting element is substantially proportional to a product of both, Eav(x)·ρ(x), thus a relationship that an increasing function Eav(x) and a reduction function ρ(x) cancel each other is established, where a brightness of the light scattering conducting element 2 is made uniform as a whole.

As is apparent from equation (13), in a shorter length L of the light scattering conducting element 2, and in a larger value of difference ΔE=E1−E2 of the effective scattering irradiation parameters, then a gradient of Eav(x) is larger. Therefore, by suitably selecting ΔE, the same extent of effective scattering parameter gradient Eav(x) is possible to be given for the light scattering conducting elements 2 with various lengths L.

If a value of E1+E2 is changed without variation of ΔE=E1−E2, then it is possible to adjust an average scattering power as a whole element.

A material processed by a kneading operation is used as a material forming the light scattering conducting block regions Γ1 and Γ2. In general, the light scattering conducting block molded processes including a kneading process which kneads transparent material having a plurality of refractive indices different from each other, has a constant scattering power within the block, irrespective of its shape.

FIGS. 4(a) to 4(e) and FIGS. 5(a) to (b) exemplify a procedure of combination of a complementary shape of each block.

FIGS. 4(a) to 4(e) show examples having variation of an effective scattering irradiation parameter average value Eav, only for one-side length direction of a light scattering conducting element. A incident direction of a light is shown by an arrow mark, only an example shown in FIG. 4(a) belongs to a system which performs a light incident from one-side, and the devices of FIGS. 4(b) to 4(e) all have a prior condition of light incident from both right and left sides on the drawing.

Figure 4D:
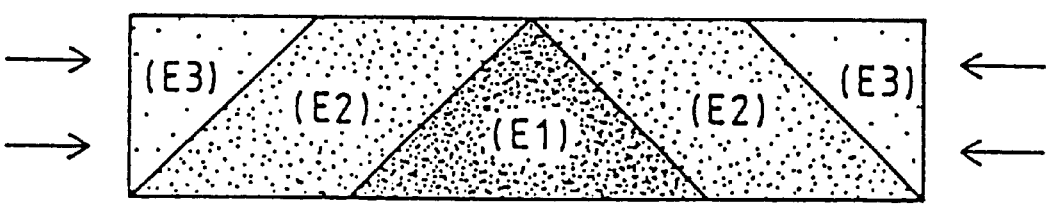
Figure 4E:
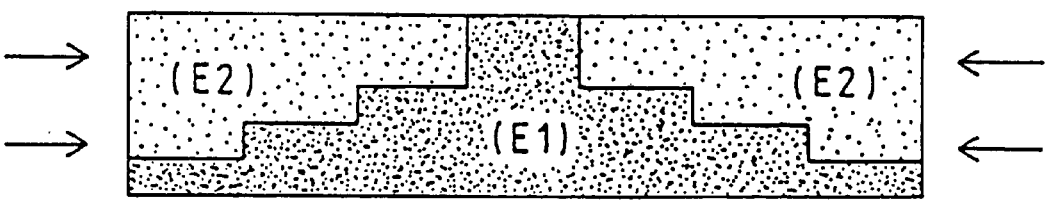

The number of block regions is two in FIGS. 4(a), 4(c) and 4(e), three in FIG. 4(b), and five in FIG. 4(d). In FIG. 4(d), three kinds of values E1, E2, and E3 are employed as a refractive index of each block, where, for those values, a material is selected so as to establish a relationship of E3<E2<E1.

FIG. 4(e) shows an example to increase a thickness of a block region having an effective scattering irradiation parameter E1 in a stage manner toward a center portion of the light scattering conducting element. In accordance with this constitution, a tilted surface or a curvature are unnecessary for each block region, thus it has a large advantage in simplifying the molding process.

FIGS. 5(a) and (b) are examples of distribution of a two dimensional effective scattering irradiation parameter average value Eav. In FIG. 5(a), the whole light scattering conducting element is of a rectangular parallelepiped shape. A light scattering conducting block region of the effective scattering irradiation parameter E1 is formed, in a pyramidal shape (square pyramid shape) with a summit of a point P0, upward from central bottoms P5, P6, P7, and P8.

For block regions with a complementary shape to be combined to those above, four block regions P0 P1 P2 P5 P6 and the like (where those are possible to be produced as one block region P1 P2 P3 P4–P5 P6 P7 P8–P0) having an effective scattering irradiation parameter E2 (E2<E1) are prepared.

A light incident in this case is performed from four directions as shown by the arrows. It is easily understood that an occupying rate in a block region of a higher effective scattering irradiation parameter is maximum (=1) at point P0 since a vicinity of the center point P0 of the light scattering conducting element is most distant from each light source.

FIG. 5(b) shows an example of a circular shaped surface light source device. In this example, circular cone shaped block regions Q1 and Q2 are formed as a block region having the highly effective scattering irradiation parameter E1 instead of the pyramidal shaped block region in FIG. 5(a). In this arrangement, in view point of a uniformity reservation for illuminance and a light utilization factor, a circular arc shaped light source may preferably be used to allow the light to be incident from a periphery of the light scattering conducting element.

To manufacture various kinds of block shapes and arrangements in FIGS. 4 and 5 with an industrially higher productivity, there must be formed various shapes of light scattering conducting blocks whose effective scattering irradiation parameter value is controlled. To achieve this, one light scattering conducting element is formed in combination with the light scattering conducting block region processed by molding and kneading a different refractive index material.

For combination of materials to be kneaded, two types are considered; namely, a first type thereof is to disperse the different refractive index polymer into a polymer matrix by kneading; and a second type is to knead the different refractive index polymer with each other. In employing either one of the above, when a refractive index difference having a value other than "0" is found, it functions as a light scattering conducting element on theory, and as a practical value, a difference between the maximum refractive index and the minimum refractive index may preferably be equal to or more than 0.001.

Typical materials among the polymer materials employed in the first type PMMA (polymethylmethacrylate), PSt (polystyrene), PC (polycarbonate) and the like. Fundamentally, including those described above, either one of polymer materials listed in Tables 1 and 2 can be used, which will be described later. Ordinary, each material described is used independently and made into a polymer matrix. However, a plurality of kinds thereof may preferably be mixed and kneaded with particle shaped substances.

| category | name of polymer | refractive index |
|---|---|---|
| MA | 1. PMMA [polymethyl methacrylate] | 1.49 |
|  | 2. PEMA [polyethyl | 1.483 |

-continued

| category | name of polymer | refractive index |
|---|---|---|
| | methacrylate] | |
| | 3.Poly(nPMA) [poly-n-propyl methacrylate] | 1.484 |
| | 4.Poly(nBMA) [poly-n-butyl methacrylate] | 1.483 |
| | 5.Poly(nHKA) (poly-n-hexyl methacrylate] | 1.481 |
| | 6.Poly(iPMA) [polyisopropyl methacrylate] | 1.473 |
| | 7.Poly(iBMA) [polyisobutyl methacrylate] | 1.477 |
| | 8.Poly(tBMA) [poly-t-butyl methacrylate] | 1.463 |
| | 9.PCHMA [polycyclohexyl methacrylate] | 1.507 |
| XMA | 10.PBzMA (polybenzyl methacrylate] | 1.568 |
| | 11.PPhMA (polyphenyl methacrylate] | 1.57 |
| | 12.Poly(I-PhEMA) [poly-1-phenylethyl methacrylate] | 1.543 |
| | 13.Poly(2-PhEMA) [poly-2-phenylethyl methacrylate] | 1.559 |
| | 14.PFFMA [polyfurfuryl methacrylate] | 1.538 |
| A | 15.PMA [polymethyl acrylate] | 1.4725 |
| | 16.PEA (polyethyl acrylate] | 1.4685 |
| | 17.Poly(nBA) [poly-n-butyl acrylate] | 1.4535 |
| XA | 18.PBzMA (polybenzyl acrylate] | 1.5584 |
| | 19.Poly(2-ClEA) [poly-2-chloroethyl acrylate] | 1.52 |
| AC | 20.PVAc [polyvinyl acetate] | 1.47 |
| XA | 21.PVB [polyvinyl benzoate] | 1.578 |
| | 22.PVAc [polyvinyl phenyl acetate] | 1.567 |
| | 23.PVClAc [polyvinyl chloroacetate] | 1.512 |
| N | 24.PAN [polyacrylonitrile] | 1.52 |
| | 25.Poly(aMAN) [poly-a-methyl acrylonitrile] | 1.52 |
| α-A | 26.PMA(2C1) (polymethyl-a-chloroacrylate] | 1.5172 |
| St | 27.Poly(o-Clst) [poly-o-chlorostyrene] | 1.6098 |
| | 28.Poly(p-Fst) [poly-p-fluorostyrene] | 1.566 |
| | 29.Poly(o, p-FSt) [poly-o-, p-diflurostyrene] | 1.475 |
| | 30.Poly(p-iPst) [poly-p-isopropyl styrene] | 1.554 |
| | 31.PSt [polystyrene] | 1.59 |
| C | 32.PC [polycarbonate] | 1.59 |

In such case, different refractive index polymers are blended, and come to a property which wears with the second type property.

The particle shaped substance dispersed into a polymer matrix made of polymer material is suitably selected from one, having a different refractive index from the polymer matrix, and capable of stably existing in the polymer matrix material (elution and modification phenomenon and the like do not arise).

For example, silicone series resin powders (for example, a brand name—manufactured by Toshiba Silicon, which is obtained in the market) or bridging particles made of various kinds of organic materials or the like, can be used as an original material. As is apparent from the equation (9), under the condition that a volume percentage of particle materials in the matrix is constant, a correlation distance "a" and a particle size R are in proportional relationship with each other. Hence, a particle size of particle material to be used may preferably be selected in consideration of such relationship described above. A typical particle size includes an extent of 0.1 $\mu$m to 10 $\mu$m.

A technique of the second type is to utilize a polymer blend process which kneads polymers of two kinds or more.

Two or more kinds of polymer materials having different refractive indices to each other (an optional shape is preferable, and a pellet shape is industrially preferable) are mixed and heated and kneaded to produce an original material of a light scattering conducting element (kneading process). A combination or a blending ratio of the polymer material to be blended is selected to give values of various effective scattering irradiation parameters E or correlation distance "a" values.

Those materials are molded to a suitable complementary shaped light scattering conducting block through a suitable process, to be formed unitarily into one light scattering conducting element by a suitable means (for example, adhesion by transparent adhesive, fixing by using reflection foil, etc. covering a light nonincident surface of the light scattering conducting element), and to produce a light scattering conducting element used in the surface light source device according to the invention.

The extremely great amount of materials which can be used in the polymer blend are introduced, typical ones of which include those listed in Tables 1 and 2.

A considerably wide selection is available for a rate of combination or mixing the polymer blend. Considering an intensity or a property of a scattering power given by a difference of refractive index and a refractive index ununiform structure produced by molding process (written by the scattering irradiation parameter E, correlation distance a", and dielectric fluctuation mean square root τ and the like), a-selection matching to an object may preferably be executed.

An optional molding technique may preferably be employed in order that the kneading materials of the first type or second type are molded to produce blocks, however it is practical to utilize an injection molding technique in consideration of productivity and economy.

Preparing a metallic die having a desired shape, original material obtained by kneading the molding machine polymer with the particle shaped substance or polymers with each other is injected at a high pressure into a molding machine metallic die in a melted liquid state, and after cooling and solidifying, the molded body is taken out from the metallic die, thus there can be obtained a light scattering conducting block having a desired shape corresponding to the metallic die shape.

For example, when manufacturing the light scattering conducting element of the type in FIG. 4($a$), at least one metallic die of wedge type may preferably be used. In case of FIG. 4($b$), a metallic die with an L character shape and a metallic die with a right angled triangle type are preferable.

Of course, when kneading particle shaped materials insoluble for polymer, or even when blending the polymers with each other, different kinds of polymers are cooled and solidified with each other through the injection molding process without complete and uniform fusion, thus achieving solidification as remaining ununiformity (fluctuation) of the local concentration of each polymer, as it is. For this reason, if the polymers to be kneaded are substantially different in refractive indices, then a light scattering conducting element having an ununiformity structure in a refractive index is manufactured.

An extrusion molding technique can be used instead of injection molding.

For example, to obtain a light scattering conducting element having a thinner and longer sectional structure in FIG. 4(a), the manufacturing process proceeds to inject kneading melted materials into the cylinder of the extrusion machine provided with a right angled triangle shaped extrusion exit, to manufacture a long sized light scattering conducting element by an ordinary procedure, and to cut into a length corresponding to a depth and length of the light source device (a dimension perpendicular to the paper in FIG. 4(a), thereby a desired light scattering conducting element band shaped block can be produced.

Next, the surface light source to which is applied a light emitting direction correction means is described.

For example in a liquid crystal display, observation of the display surface is performed in general from a sector shaped space region in the forward direction. In such case, an emitted light (illuminating light) from the back light source is desired to distribute with a higher intensity in a suitable angular range in a forward direction. Such requirement is met by utilizing the emitting direction correction means.

FIG. 6 shows an example, in contrast to the light scattering conducting element of the type in FIG. 4(b), in which another set of scattering light emitting direction correction elements is provided on its scattering emitting output surface-side, where a light scattering conducting element 11 is formed of a higher scattering power region of an L character shaped effective scattering irradiation parameter E1 and a lower scattering power region of two effective scattering irradiation parameters E2 forming a plate shape complementary for the higher scattering power region. A light source (fluorescent lamp) 12 is arranged on both sides of the light scattering conducting element 11, and a scattering light emitting direction correction element 14 is provided on a scattering light output surface 15 side. A back surface 16 of the light scattering conducting element 11 is an optically released surface, and the main body of the light scattering conducting element 11 is not subjected to a light scattering enforcement treatment such as a light scattering ink pattern or an irregular diffusion surface. Opposing the back surface 16 is another reflector (white film plate) 13 separated from the light scattering conducting element 11.

The scattering light emitting direction correction element 14 uses a thin plate or a sheet shaped member with a prism shaped irregularity as shown in the drawing. The emitting direction correction element 14 corrects the light emitted in a oblique direction from the light scattering conducting element 11 to the upper direction by a refracting operation.

Various types may preferably be used for a concrete shape of the emitting direction correction element without being limited to those in the drawings. For example, there may preferably be used a film distributed thereon with a group of protrusions of a triangle cone shape or a dome shape, or a plate shaped prism element having convex portions arranged in line.

The irregularity surface to produce a refracting operation may preferably be placed on either one of upper-side (spaced apart from the light scattering conducting element 11) or lower-side (in the vicinity of the light scattering conducting element 11) so long as there exists a function capable of correcting the emitted light in an oblique direction from the light scattering conducting element 11 into a desired direction. A direction in which an emitted light is collected by the emitting direction correction means is not always limited to the forward direction of the light scattering conducting element, thus by selecting an angle of the prism, the scattering emitting light in the oblique direction can be strengthened.

FIG. 7 shows a surface light source device, in contrast to the light scattering conducting element of the type in FIG. 4(c), which is provided on its light output surface with an emitting direction correction means formed unitary with a light scattering conducting element 21. The emitting direction correction means is provided as a prism shaped irregularity 22. The shape of each block region having effective scattering irradiation parameters E1 and E2 is also shown in the drawing. The operation of the prism shaped irregularity 22 is the same as operation of the scattering light emitting direction correction element 14 in FIG. 6. In FIG. 7, 24 depicts a another reflector (white film plate) separately provided from each light emitting conducting element 21, and 25 depicts a light source (fluorescent lamp) arranged on both-sides of the light scattering conducting element 11.

FIG. 8 shows an example, wherein a emitting direction correction means unitarily formed with a light scattering conducting element 31, on an opposite-side surface of a light output surface of the light scattering conducting element 31 is provided between two light sources (fluorescent light) 35. The emitting direction correction means is provided as a prism shaped irregularity 32. An opposing arrangement of a reflector 34 is the same as in FIGS. 6 and 7. Each region shape of effective scattering irradiation parameters E1 and E2 corresponds to one upside down in FIG. 4(c).

An operation of a prism shaped irregularity 32 is a little more complicated compared to the scattering light emitting direction correction means 14 and 22 in FIGS. 6 and 7. A pitch, a summit angle, or a depth of irregularity or the like of each prism is capable of realizing an optimum correction of the direction and can practically be determined by employing an experimental procedure. A space shown by 33 may be made a air region.

A procedure for forming an irregularity region on a front surface region and back surface region of the light scattering conducting element body may preferably employ a method of attaching a predetermined shape on the metallic die or the extrusion exit used for the injection molding type or the extrusion molding type. In addition, there may preferably be employed a method of pressing, a mechanical machining method such as cutting, and a chemical machining process such as various kinds of etchings and so forth.

A more concrete example is described as the following.

EXAMPLE 1

Pellet of Methacryl resin (ASAHI CHEMICAL Co., Ltd.; DELVET 80N) is added by 3 wt % of silicone series resin powders (TOSHIBA SILICONE Co., Ltd.; TOSPEARL 130) with a particle size 3 μm, then the control proceeds to mix and diffuse by a mixer, thereafter to extrude in a strand shape by the extrusion machine, and to produce a pellet by a pelletizer, thereby the silicone series resin powders are uniformly dispersed to produce the pellet.

Thus obtained pellet is molded by using the injection molding machine under the condition of a cylinder temperature 230° C. to 260° C., and a die temperature 50° C. In this process, a wedge shaped light scattering conducting block having a height 80 mm, a width 100 mm with a thickness linearly varying from 1 mm (thinnest portion) to 3 mm (thickest portion) along a longitudinal direction, is produced and made as a light scattering conducting block Γ2.

The methacryl resin pellet (ASAHI CHEMICAL Co., Ltd.; DELVET 80N) is added by 0.01 wt % of silicone series resin powders (TOSHIBA SILICONE Co., Ltd.; TOSPEARL 130) with a particle size 39 μm, then the same process is applied thereto. In this way, a wedge shaped light scattering conducting block having a height 80 mm, a width 100 mm, with a thickness linearly varying along a longitudinal direction from 1 mm (thinnest portion) to 3 mm (thickest portion) is obtained. This is made as a light scattering conducting block Γ2.

These two wedge shaped scattering light conducting blocks Γ1 and Γ2 having shapes complementary to each other have oblique surfaces which are tightly fixed to each other to produce one sheet of a plate shaped light scattering conducting element, which is used toconstitute a surface light source device in a pattern shown in FIG. 9.

This light scattering conducting element belongs to a type in FIG. 3. A light source is arranged on one-side (weakened-side of average scattering power) of a light scattering conducting element 41. A front surface of a reflecting plate 43 arranged on back surface-sides of the light scattering conducting element 41 is made as a mirror surface. In the block region Γ1, particle substance to be a scattering center is diffused at a higher density than the block region Γ2. This therefore establishes E1>E2 in relation to the effective scattering irradiation parameters E1, E2 of the block regions Γ1 and Γ2.

As a whole light scattering conducting element 41, there is realized a structure in which an average effective scattering irradiation parameter value Eav in relation to a thickness direction is gradually increased ranging from an end portion in an adjacent-side to a light source 42 and toward an end portion apart-side from the light source 42. A structure in FIG. 9, where the light is incident from a lateral surface on a smaller side of Eav value, enables to achievement of a uniform illuminance in the surface light source device.

To confirm this, an intensity of the scattering emitted light is observed in arrow mark VD direction by using a video camera and an intensity display device, then over all light output surface of the light scattering conducting element 41, a light intensity difference between a brightest portion and a darkest portion is only about 5%. This comes to a ratio of 95% for contrast of the bright and darkest portions, and results in confirming an extremely high uniformity of the illuminance.

EXAMPLE 2

Polymethylmethacrylate (PMMA) is added by 0.4 wt % of polystyrene (PSt), and mixed for ten minutes using a V type tumbler and then mixed for five minutes using a HENSCHER mixer. The resultant is fused and mixed under the condition of a cylinder temperature 220° C. to 250° C., a screw rotating speed 75 rpm, a discharging amount 6 kg/hr using a two shaft protrusion machine with a diameter 30 mm made by NAKATANI MACHINE Co., Ltd.

Continued to the above, the pellet is molded using the injection molding machine under the condition of a cylinder temperature 220° C. to 250° C., a die temperature 65 T, an injection speed, a middle speed, an injection 2 pressure a shot pressure plus 10 kg/cm². Thus, a wedge shaped light scattering conducting block having a height 80 mm, a width 100 mm with a thickness linearly varying along a longitudinal direction ranging from 1 mm (thinnest portion) to 3 mm (thickest portion), is produced and made as a light scattering conducting block Γ1'.

Polymethylmethacrylate (PMKA) is added by 0.01 wt % of polystyrene (PSt), and the resultant is used, by the same process, to produce a wedge shaped light scattering conducting block having a height 80 mm, a width 100 mm with a thickness linearly varying along a longitudinal direction ranging from 1 mm (thinnest portion) to 3 mm (thickest portion). This is made as a light scattering conducting block Γ2'.

These two wedge shaped scattering light conducting blocks Γ1' and Γ2' having shapes complementary to each other have oblique surfaces that are tightly fixed to each other to produce one sheet of a plate shaped light scattering conducting element, which is used to constitute a surface light source device in a modification shown in FIG. 9.

This light scattering conducting element also belongs to the type in FIG. 3, and E1'>E2' is established for the effective scattering irradiation parameters E1' and E2' of the block region Γ1'. Thus, in this case there is obtained a structure wherein the average effective scattering irradiation parameter value Eav in relation to a thickness direction is gradually increased ranging from an end portion adjacent to the light source and to an end portion apart from the light source. As is the case of the embodiment <1>, a uniform emitting light intensity is achieved ranging an entire light output surface.

To confirm this fact, the same observation as in the embodiment <1>is performed using a video camera and an intensity display device from arrow mark VD direction, then for an entire light output surface, an extremely high uniformity of the illuminance such as a contrast ratio of a darkest portion and a brightest portion 90% is confirmed.

[2] a surface light source device using a light scattering conducting element in combination with a light scattering conducting block region and a transparent light conducting region FIG. 10 is a sectional view showing one embodiment of a surface light source device using a light scattering conducting element having a combination of a light scattering conducting block region and a transparent light conducting region. In the drawing, a surface light source device is shown in an attitude of illuminating from an under-side an object to be illuminated such as a liquid crystal display panel and the like, arranged on an upper-side thereof. The surface light source device is formed of a light scattering conducting element 50 of a square plate shape forming a light scattering conducting block region, and a rod shaped light source 52 arranged along one end surface of the light scattering conducting element 50, as main constituent elements.

The light scattering conducting element 50 has a structure which is laminated with a light diffusion plate 53 formed of the light scattering conducting body executing a light scattering function and a light conducting function, and a transparent plate 54 executing a light conducting function.

The light diffusion plate 53 is arranged in adjacent-side to the object to be illuminated, and the transparent plate 54 is arranged apart-side from an object to be illuminated. Both are of the same shape whose sectional view is a right angled triangle, and laminated in relationship where both oblique surfaces are opposed to each other. Therefore, one-side end surface of the light scattering conducting element 50 is an end surface of the transparent plate 54, and the other end surface is an end surface of the light diffusion plate 53.

The transparent plate 54 is formed of a transparent acrylic resin etc. The light diffusion plate 53 may preferably use a material formed of opalescent acrylic resin etc. In addition, to add a light scattering power in a transparent matrix material, fine particles having different refractive indices may preferably be dispersed and mixed by using a kneading process. A method of obtaining the light diffusion plate 53 by using a polymerizing process, will be described later.

The light diffusion effect may preferably be enhanced through additionally providing a thin auxiliary light diffusion plate on the light diffusion plate 53, or grinding a surface of the light diffusion plate 53 into a ground glass to produce the light diffusion surface. Such additional means is applied to the embodiments as hereunder described.

For a junction of the light diffusion plate 53 and the transparent plate 54, an adhesive material may preferably be inserted in a boundary face therebetween, or an method of fixing by pressing the both ends using any of fasteners or fittings is preferable.

The rod shaped light source 52 is arranged along an end surface of the transparent plate 54 side. For this reason, as is apparent from FIG. 10, the transparent plate 54 has a shape whose thickness decreases with traveling of the light incident from an end surface of the rod shaped light source 52 side. The light diffusion plate has a shape whose thickness increases with traveling of the light incident from said end surface of the light diffusion plate.

A florescent lamp having a hot cathode or a cold cathode is typically used as a rod shaped light source 52. A reflector 55 is arranged in a manner of embracing the rod shaped light source 52 in order to raise a light utilization efficiency. As a rod shaped light source 52, a light source having a thin light emitting section as suitably called as a line shape is sometimes used. Those matters are commonly applied to the surface light source devices shown in FIGS. 1 to 13.

A sheet shaped reflector body 56 is provided on back surface-side of the transparent plate 54. The reflector body 56 is formed of a thin reflecting plate. However, the reflector body 56 may preferably be constituted through forming a reflecting film by vapor depositing aluminum on a back surface of the transparent plate 54. Most of light incident on the transparent plate 54 total-reflects on its back surface, and a good amount of brightness is obtained without providing the reflector body 56. However, through the reflector body 56, a loss due to light emitting from the back surface is prevented and a light utilization efficiency is graded.

The light generated from the rod shaped light source 52 is incident on the inside of the transparent plate 54 from an incident end surface directly or through the reflector 55. Thus incident light propagates inside the transparent plate 54 while being total-reflected on the reflector body 56 on a back surface of the transparent plate 54 or on the boundary face between the transparent plate 54 and the light diffusion plate 53.

The light having an enlarged incident angle through reflection or the like by the reflector body 56 is incident on the light diffusion plate 53 from the boundary face, and receiving a scattering operation in the medium of the light diffusion plate 53 to be diffused. Thus diffused light is emitted from a surface of the light diffusion plate 53, and illuminates the to-be illuminated object arranged on an upper portion. The object is not always disposed on the upper portion of the surface light source device however.

For example, the surface light source device is inverted upper and lower from an attitude shown in the drawing, and preferably the object to be illuminated is arranged on a lower portion of the surface light source device, or preferably by setting up the surface light source device, the object to be illuminated is arranged on a lateral-side of the surface light source device.

As is apparent from the explanation the above, the light diffusion plate 53 is arranged in adjacent-side to the object to be illuminated, thus, a light traveling upward by diffusing at the light diffusion plate 53 becomes a illuminating light without passing through the boundary face with the transparent plate 54. Thereby, a high utilization efficiency of the light is obtained.

FIG. 11 is a sectional view showing a second embodiment of a surface light source device using a light scattering conducting element in combination with a light scattering conducting block region and a transparent light conducting region. This surface light source device is mainly formed of the square plate shaped light scattering conducting element 50 forming the light scattering conducing block region, and a pair of rod shaped light sources 52 arranged along both end surfaces in parallel relationship with each other at the light scattering conducting element 50.

The light scattering conducting element 50 has a structure such that there are laminated the light diffusion plate 53 formed of the light scattering conducting body executing the light scattering function and the light conducting function, and the transparent plate 54 executing the light conducting function.

The light diffusion plate 53 is arranged adjacent-side to the object to be illuminated, and the transparent plate 54 is arranged apart-side from the object to be illuminated. The light diffusion plate 53 has a shape of an isosceles triangle whose sectional view is flat. On the other hand, the transparent plate 54 has a shape complementary to the light diffusion plate 53, and is arranged such that the oblique surface of the light diffusion plate 53 opposes its flat V character shaped portion. Hence, both surfaces of the light scattering conducting element 50 are end surfaces of the transparent plate 54.

As is apparent from FIG. 11, the transparent plate 54 has a thickness which decreases with traveling of the light incident from both surfaces and allows a center portion to have a thin shape. On the other hand, the light diffusion plate 53 has a thickness which increases with traveling of the light incident from both ends and allows a center portion to have a thick shape.

A material of the transparent plate 54 and the light diffusion plate 53, a method of joining both, a reflector body 56 provided a back surface of the transparent plate 54 and the like are the same as in the first embodiment shown in FIG. 10.

An operation of the surface light source device shown in FIG. 11 differs from the first embodiment only in that a light is incident on both ends of the light scattering conducting element 50 to propagate toward a center portion. Those other than the above are the same as the first embodiment, thus the detail thereof is omitted throughout.

It is apparent that the second embodiment using two rod shaped light sources 52 provides a surface light source device that is correspondingly brighter than the first embodiment. Of course, if the second embodiment is modified to arrange a rod shape light source on four edges of the light scattering conducting element 50, then a still brighter surface light source device can be obtained. In such case, a shape of the light diffusion plate 53 is a flat square cone, and the transparent plate 54 is of a shape having a concaved portion receiving the square cone configuration.

FIG. 12 is a sectional view showing a third embodiment of a surface light source device using a light scattering conducting element in combination with a light scattering conducting block region and a transparent light conducting region.

This surface light source device is a modification of the surface light source device of the first embodiment shown in FIG. 10. That is, an incident angle correction member 57 is arranged between the light diffusion plate 53 and the transparent plate 54 in the surface light source device in FIG. 10.

The incident angle correction member 57 is employed to correct an incident angle of the light incident on the light diffusion plate 53. A light, which is incident on the light diffusion plate 53 at a smaller incident angle from among lights incident from the oblique surface of the transparent plate 54, is hardly incident on the inside of the light diffusion plate 53 at a higher efficiency. If an incident angle is small, then the scattering rate to the illuminated object side tends to be lower because of a forward scattering property of the medium even when incident on the inside of the light diffusion plate 53.

Then, the incident angle correction member 57 is arranged between the light diffusion plate 53 and the transparent plate 54, to enlarge the incident angle, and to upgrade utilization efficiency of the light as a surface light source device.

For such incident angle correction member 57, the same one as the light emitting direction correction element 14 shown in FIG. 6 can be used, and in the surface light source device in FIG. 12 is used one which is formed into a prism shaped irregularity with a right angle isosceles triangle shape. This member is sometimes called "a prism sheet", that is ordinarily made of transparent resin, and preferably glass.

Instead of inserting the incident angle correction member 57 between the light diffusion plate 53 and the transparent plate 54, an incident angle correction member 57 may preferably be made by forming the prism shaped irregularity on a surface of the transparent plate 54.

Construction and operation of the other portions thereof are the same as the surface light source device (the first embodiment) shown in FIG. 10, so the explanation thereof will be omitted throughout. In addition, for the surface light source device (the second embodiment) shown in FIG. 11, it is possible to arrange the incident angle correction member 57 between the light diffusion plate 53 and the transparent plate 54.

FIG. 13 is a sectional view showing a fourth embodiment of a surface light source device using a light scattering conducting element in combination with a light scattering conducting block region and a transparent light conducting region.

This surface light source device is such that the surface light source device of the first embodiment in FIG. 10 is varied of its transparent plate 54. The transparent plate 54 in the surface light source device in FIG. 13 is formed by laminating the thin transparent substrate 41 made of the same material, and its external view is the same as the transparent plate 54 in the surface light source device in FIG. 10.

With such a transparent plate 54 being employed, a light incident from an incident end of each transparent substrate 41 propagates toward the light diffusion plate 53 while being total-reflected with a high efficiency on a boundary face of each substrate 41. Hence, each transparent substrate 41 functions as a light guide for transmitting light with a high efficiency. Thus propagated light emits from an end surface of each transparent substrate 41 subjected to an oblique cut to be incident on the light diffusion plate 53, and to generate a diffusion light with high efficiency.

The transparent substrates 41 may preferably be adhered by an adhesive agent to each other, or the laminated transparent substrates are fixed preferably by fastening using fixing tools. A light amount, which transmits through the boundary face between the transparent substrates 41 and reaches the back surface of the transparent plate 54, is not zero, therefore it is preferable that the reflector body 56 is arranged on the back surface of the transparent plate 54.

The construction and operation other than the above are the same as in the surface light source device shown in FIG. 10 (the first embodiment), so the explanation will therefore be omitted. The transparent plate 54 in the surface light source devices shown in FIGS. 11 and 12 (the first embodiment and the second embodiment) may preferably be formed of a plurality of transparent substrates which are laminated.

As hereinbefore described, a polymerizing process is utilized so as to obtain the light diffusion plate 53 used in the embodiments in FIGS. 10 to 13, which will be described follow.

As is well known, if the refractive index ununiform structure exists in a medium, the scattering in wave optics arises. The medium having such refractive index ununiform structure can be produced by using a polymerizing process.

For example, the control proceeds to dissolve polymer of the second material by a small amount uniformly into a monomer of the first material, to add a polymerizing start agent, and to allow them to cause a polymerizing reaction. If the second material polymer and the first material which has become a polymer have a smaller compatibility (solubility with each other), the second material gradually forms a condensing structure, and then a fluctuation state of refractive index, i.e., the refractive index ununiformity structure is generated. Such combination includes the monomer of methylmethacrylate (the first material) and the polymer of trifluoromethylmethacrylate (the second material). A preferable solubility of the latter to the former is equal to about 0.2 wt %.

The refractive index ununiformity structure may also be produced by polymerizing reaction arising from a suitable mixture of each other, the first material monomer and the second material monomer.

In this case, the combination is selected to establish a relationship of $r1>1$ and $r2<1$ in respect of a reactive ratio $r1$ of the first material monomer and a reactive ratio $r2$ of the second material monomer. This selection provides prior polymerization of the first material monomer, and the gradual increase of a rate of the second material included in whole monomer which is not yet reacted. When most of the first material monomer has been polymerized, a rate of the second material monomer and the amount which has been polymerized begins to increase.

In the final stage of the reaction, the second material polymer only is produced. If a compatibility of the first material polymer and the second material polymer is relatively smaller, those having similar compositions, i.e., the first material polymer and the second material polymer, each forms a condensed structure. If the refractive indices of both polymers differ, the refractive index ununiformity structure is produced.

Such combination includes the monomer of methylmethacrylate (a first material) and the monomer of vinylbenzoate (a second material). The both are, for example, copolymerized at a rate of 4:1, then a medium having the refractive index ununiformity structure can be obtained.

Further another method of obtaining the refractive index ununiformity structure is a method of utilizing a polymerizing reaction of a monomer of a single material.

To achieve this reaction, a material having a larger difference of specific gravities of monomer and polymer is used. When the monomer polymerization reaction of such material proceeds to a certain extent, the polymer is hardened, and by a volume contraction when the remaining monomer is varied into polymer, an infinite number of microvoids are formed. These microvoids are uniformly three dimensionally distributed into the polymer after completion of the polymerizing reaction, and function as a scattering center.

The refractive index ununiformity structure produced by, the polymerizing process as described above, produces an extremely high uniform scattering power. This is because the refractive index ununiformity structure is gradually formed from a uniformly dissolved status at an individual molecular level before polymerization. When using the light diffusion plate formed of the medium having thus formed refractive index ununiform structure, there can be obtained a light diffusion effect in accordance with an extremely high uniformity of light scattering power.

[3] A surface light source device using a wedge shaped light scattering conducting element of an emitting directionality and a wedge type emitting direction characteristic adjusting element FIG. 14 is a perspective view of essentials of a first embodiment of a surface light source device according to the invention.

In the drawing, numeral 61 depicts a wedge shaped light scattering conducting element of an emitting directionality. The light scattering conducting element 61 is here produced by uniformly diffusing the silicon series resin material (a refractive index=1.4345) at a rate of 0.07 wt % into polymethylmethacrylate (PMMA). Its size is, for example, of a length 68 mm from left to right in the drawing, a width 85 mm, a thickness 4.0 mm at an end of the light incident surface 62 side, and a thickness 0.2 mm but at an end of a terminal end surface 66 side.

Symbol L depicts a fluorescent lamp with a diameter 3 mm arranged apart by 1 mm from the incident surface 62 of the light scattering conducting element 61. The light rightward from the lamp L is incident on the inside of the light scattering conducting element 61 from the incident surface 62. Symbol 63 depicts a light output surface, and an illuminating light is taken from such surface. A reflector body 65 with a positive reflection property or a diffusion reflection property is fixedly arranged to a back surface 64 of the light scattering conducting element 61.

The reflector body 65 may preferably be another body of a reflector member (for example, tin foil sheets) separated from the light scattering conducting element, or a reflector film (for example aluminum vapor deposit film) formed on the back surface 64. When using the reflector member having a possibility of deteriorating a reflection property by ultraviolet ray as is the case of the silver foil sheet, then an adhesive agent with an absorptivity for ultraviolet ray may be applied to the back surface.

Preferably, the light scattering conducting element 61 is manufactured by an injection molding technique of plastic material, where the so called inmold method is applied for fixing the reflector body 65.

A symbol 70 depicts a wedge type emitting direction characteristic adjusting element arranged in a complementary relationship to light scattering conducting element 61. End surfaces thereof 71 and 72 are in a positional relationship in alignment with the light incident surface 62 and the terminal end surface 66 of the light scattering conducting element 61.

When the size described above is used in the light scattering conducting element 61, a wedge type emitting direction characteristic adjusting element 60 has a size a length 68 mm in right and left direction in the drawing, a width 85 mm, a thickness 0.5 mm at an end of the light incident surface 62 side, and similarly a thickness 4.3 mm at an end of the terminal end surface 66.

A surface opposing, through a thin air layer or air gap AR, to the light output surface 63 of the light scattering conducting element 61 is a light input surface 73 where is formed a prism shaped irregularity aligned in a crossing direction viewed from the light incident surface 62 side. An opposite side surface of the light input surface 73 is a light output surface 74. A light emitted from the light output surface 74 (displayed by arrow mark group) proposes an illuminating light.

The wedge type emitting direction characteristic adjusting element 70 is formed of the light scattering conducting element having a weak scattering power. The material thereof is such that silicon series resin material (refractive index=1.4345) is diffused at a rate of 0.05 wt % into polymethylmethacrylate (PMMA) which is a matrix material the same as in the light scattering conducting element 61.

The scattering power of the wedge type emitting direction characteristic adjusting element 70 is mainly given for adjusting a relaxation degree of a directionality of an emitted light of the surface light source device. Accordingly, an amount of different refractive index particles diffused for generating the refractive index ununiformity structure is desired to be determined in consideration of utilization or application or the like of the surface light source device.

When the relaxation of directionality of the emitting light of the surface light source device is not required, then the wedge type emitting direction characteristic adjusting element 70 may preferably be formed with transparent material (a material having a value of effective scattering irradiation parameter E is substantially equal to 0, for example, polymethylmethacrylate itself) which completely prevents the different refractive index particles from being dispersed.

Next, an explanation is made in detail referring to FIGS. 16 and 17($a$), for (1) the technical meaning that the light scattering conducting element 61 has a wedge shaped section, and (2) a light emitting direction correction function of the prism shaped irregularity line formed on the light input surface 73 and a directionality relaxation function corresponding to a scattering power given to the wedge type emitting direction characteristic adjusting element. The prism shaped irregularity formed on the light input surface 73 executes operation the same as in the light emitting direction correction means in the surface light source device shown in FIGS. 6 to 8 as formerly described.

(1) a wedge shaped section of the light scattering conducting element 61

FIG. 16 is an illustrative view showing a wedge section of a wedge shaped light scattering conducting element 61 used in the arrangement in FIG. 14. In the drawing is shown a repeated reflection inside the light scattering conducting element 61. A light traveling into the light scattering conducting element from the light incident surface 62 is thus represented by a ray B0. A light source (fluorescent lamp) L is arranged facing the light input surface 62, then it is considered that a propagating direction of the representative ray B0 approximates, as shown, a horizontal direction.

Considering a movement of this ray B0, the ray B0 traveling into the light scattering conducting element 61 from the input surface 62 is propagated while receiving directional transfer by scattering at a predetermined rate, and its process, as shown in the drawing, repeats reflection on the back surface 64 a gradient to the light output surface 63, and approximates the thinner terminal end 66 of the light scattering conducting element 61. A reflection on an inside surface of the surfaces 64 and 65 is defined as positive reflection, thus, an incident angle and a reflecting angle in individual reflection are equal to each other (θ1, θ2, θ3, ...).

Now in an attention to each of the reflections in the light output surface 63, a relationship of θ2>θ4>θ6 is established.

Considering a boundary face transmittance relating to each reflection, a total reflection arises under condition of θ1>ac (ac represents a critical angle, approximating 42° at PMMA—air boundary face), and with θi lower than ac, the transmittance steeply arises. With θi lower than a predetermined value (around 35° at PMMA—air boundary face), the transmittance becomes substantially constant. FIG. 16 shows a status where emitting lights B4 and B6 are produced by a relationship of θ2>ac>θ4>θ6.

Such effect is produced almost similarly even in presence of some differences in case of a primary scattering light or a multiplex scattering light without limiting to the representative ray B0 (non-scatter light). Therefore, the light scattering conducting element 61 as a whole produces an effect which is capable of increasing a light emitting rate from the light output surface 63 with the increased distance far from the light incident surface 62.

Evaluating such effect by a function f(x) of a distance x from the light incident surface 62, f(x) is an increasing function in relation to "x". On the other hand, a portion approximating the light incident surface 62 exhibits a proximity effect for the light source L in respect of either one of a direct light or a scattering light. This poximity effect is evaluated by g(x), then g(x) is a reduction function of the distance "x".

Hence, the proximity effect g(x) is canceled by f(x). As a result, a sufficient amount of light is guided on a region far from the light incident surface 62, and an emitting light is emitted from the light output surface 63. The time that light within the light scattering conducting element 61 is incident on the light output surface 63, tends to increase with the increased distance from the input surface 62 by a wedge shape effect, and this fact also prevents a lack of brightness at a terminal end of the light scattering conducting element 61.

Absolutely no limitation is provided on an angle ψ formed by surfaces 63 and 64, however in case of considering a brightness level, uniformity degree, directional property each of the illuminating light, thickness of the surface light source device and the like, then one practical range is $0.5° \leq \psi \leq 5°$.

By rendering the back surface 64 (the light output surface 63 depending on the circumstances) curvature, it is possible to adjust an increase transition of reflecting angles θ1, θ2, θ3 ..., and to realize more desirable characteristic.

The effect as hereinbefore described is also similarly apparently established even in arranging the reflector body 65 along the back surface 64. In addition, to propose a higher illuminating light having an intensive directionality with a high parallel degree, the reflector body 65 may preferably be of a positive reflection property and not diffusion reflection property.

(2) a light emitting direction correction function of prism shaped irregularity formed on the light input surface 73 of the wedge emitting direction characteristic adjusting element 70 and a directionality relaxation function depending on a scattering power given to the wedge type emitting direction characteristic adjusting element.

FIG. 17(a) is an enlarged sectional view showing a portion designated by arrow mark F in FIG. 14. Using this drawing, the function described above of the wedge type emitting direction characteristic adjusting element.

In the drawing, G1 and G2 depict rays representing a light flux of directionality emitting from the light scattering conducting element 61. As formerly discussed, an incident angle φ1 is considered as around 37°, an emitting angle is considered as around φ2 65°, each to the light output surface 63 of the light scattering conducting element 61. Repeated oblique surfaces H and H' forming the prism shaped irregularity are formed on the light input surface 73 of the wedge type emitting direction characteristic adjusting element 70.

Now assuming that an angle formed by the light output surface 3 and the light emitting surface 74 is equal to 3°, (this is ordinarily designed equal to an angle formed by the light output surface 7 of the light diffusion conducting element 1 and the back surface 74). A tilting angle of an oblique surface H is selected so that the representative rays G1 and G2 are substantially perpendicularly incident. A tilting angle of the oblique surface H' are selected so that the representative rays G1 and G2 are positively reflected substantially perpendicularly upwardly. In this case, an incident angle φ3 on positive reflection is equal to approximately 56° (>αc=42°), thus this satisfies with allowance a condition of the total reflection.

Therefore, such condition is to provide one sufficient condition in that a propagating direction of an illuminating light with a directionality emitted from the light scattering conducting element 61 is converted to a perpendicular direction for the light emitting surface 74 of the wedge type emitting direction characteristic adjusting element 70 (displayed by G1' and G2').

A tilting angle of the oblique surface H and H' is designed in consideration of the direction of rays G1 and G2, and an angle and a refractive index of wedge shape of both elements 61 and 70, thus the illuminating light may be generated over a wider selected range to a different direction from the forward direction of the light emitting surface 74.

One preferable range of a summit angle of each prism element having a prism shape irregularity formed on the light input surface 73 of the wedge type emitting direction characteristic adjusting element 70, is equal to 60° to 70° (for example, 64°). A pitch of the prism shaped irregularity may preferably be equal to or less than 509 m within a range in which any diffraction effect does not arise in view of an influence to brightness uniformity.

Considering a function of the wedge type emitting direction characteristic adjusting element 70 formed of the light scattering conducting element, and not of a transparent material, the propagating direction of the light within the wedge type emitting direction characteristic adjusting element 70 becomes wider depending on an intensity of the scattering power regulated by the size of the effective scattering irradiation parameter E.

For example, in FIG. 17(a), there increases a rate of lights G1" and G2" emitting in a direction other than the lights G1' and G2' in forward direction. The scattering power given to the wedge type emitting direction characteristic adjusting element 70 is relatively small, thus, a provability of multi-scattering is not so large. For this reason, the light diffusion arises mainly on a front portion. A transfer angle is a propagating direction of the light in the wedge type emitting direction characteristic adjusting element 70 inside and is not so large.

Under such condition, a possibility of generating the total reflection on the light emitting surface 74 for the scattering light is extremely small, and most of the scattering light is emitted to the external air layer, as it is, and becomes an illuminating light. Therefore, a range of propagation direction of the illuminating light is adjusted through intensity of the scattering power given to the wedge type emitting direction characteristic adjusting element 70.

Finally, the wedge type emitting direction characteristic adjusting element 70 is an element provided at the same time with adjustment function for both intensities of a propagation direction and a directionality of the illuminating light emitted from the surface light source device.

The discussion as described above as to the embodiment in FIG. 14 in relation to directional characteristic of the illuminating light has been performed in attention to vertical or longitudinal direction as viewed from the incident surface 62 of the light conducting element 61.

Under the condition exemplified above, a light emitted from the light emitting surface 74 of the wedge type emitting direction characteristic adjusting element 70 includes a good amount of the light (designated by 74f' in FIG. 14), in a lateralward direction, which is mixed into the light (designated by 74f in FIG. 14) propagated in a forward direction.

In certain circumstances, an adjustment of directionality in a transverse or cross direction with respect to the illuminated light is required. In FIG. 15, an embodiment suitable for such case is shown in the same form as in FIG. 14.

The embodiment shown in the drawing is the same as in the embodiment in FIG. 14 in respect of the element used, and materials thereof, accordingly the explanation for the individual elements is omitted throughout. A different point of this embodiment from the embodiment in FIG. 14 resides in an alignment direction of the prism shaped irregularity formed in the light input surface 73 of the wedge type emitting direction characteristic adjusting element 70. In other words, in this embodiment, the prism shaped irregularity formed in the light input surface 73 of the wedge type emitting direction characteristic adjusting element 70 is aligned in a longitudinal direction.

With this alignment direction being selected, a direction correcting operation as described referring to FIG. 17(a) is exerted in the transverse direction. Consequently, as to the transverse direction, the illuminating light is prevented from emitting in a direction largely shifted from the forward direction of the surface light source device. Arrow mark group 74f'' in FIG. 15 designates a status of aligning in the transverse direction with respect to the illuminating light.

Also in the third embodiment, in accordance with the same principle as in the embodiment shown in FIG. 14, a degree of sharpness of the directionality is adjusted through an extent of an intensity of the scattering power of the wedge type emitting direction characteristic adjusting element 70.

FIG. 18 shows the embodiment simultaneously having a feature of the surface light source device shown in FIGS. 14 and 15.

FIG. 18 shows in the same form as in FIG. 14, where elements used and materials of each element and the like are all the same as shown in FIG. 14, so the explanation as to individual element will be omitted. In this embodiment, a different portion from said two embodiments is that the prism shaped irregularity is formed on both surfaces of the light input surface 73 and the light emitting surface 74 of the wedge type emitting direction characteristic adjusting element 70, and yet alignment directions thereof are orthogonal to each other.

In this embodiment, the prism shaped irregularity formed on the light input surface 73 of the wedge type emitting direction characteristic adjusting element 70 has an alignment direction in the longitudinal direction, and the prism shaped irregularity line formed on the light emitting surface 74 has an alignment direction in a transverse direction.

From such alignment direction, a light propagating direction is corrected as to the longitudinal direction in the light input surface 73 of the wedge type emitting direction characteristic adjusting element 70, and the light propagating direction is corrected as to the crossing or transverse direction in the light emitting surface 74. Consequently, as shown by arrow mark group 74f, an emitting light aligned of an essential propagating direction is generated with respect to both of the transverse direction and the longitudinal direction (an illuminating light corresponding to the light shown by arrow mark 74f' in FIG. 14 is suppressed).

A correcting operation in the light input surface 73 is performed as in the embodiment in FIG. 14, however a correcting operation in the light emitting surface 74 is a little different in the procedure of using the refractive. Such is explained in FIG. 17(b), and a portion designated by symbol F' in FIG. 18 is shown in an enlarged sectional view.

J1 to J3 in the drawing represent a light flux emitted from the wedge type emitting direction characteristic adjusting element 70. The ray J1 representing a light almost in parallel with the light emitting surface 74 reaches the oblique surface H1, and satisfies a critical angle condition, and is once emitted to the external air layer, thereafter a good amount thereof is re-reflected at an adjacent oblique surface H2. This reflection light is emitted, as an illuminating ray J1', in the direction adjacent to a front surface of the light emitting surface 74.

The ray J2 representing a light almost vertical to the light emitting surface 74 (where said "a light" is in a range satisfying a critical angle condition in the oblique surfaces Hi to H3) reaches the oblique surface H1, and is refracted along the oblique surface H1, and then emitted to the external air layer. This ray J2' also comes to an illuminating light which is propagated in a direction approximating the forward direction.

The ray J3 representing a light more vertical to the light emitting surface 74 (where said "a light" is in a range which does not satisfy a critical angle condition in the oblique surfaces H1 to H3), for example, reaches an oblique surface H3, and is total-reflected, thereafter is incident on the adjacent oblique surface H2. Then the incident angle is enlarged by the total reflection in the oblique surface H2, thus as in the ray J2, further refracted as along the oblique surface H2 to be emitted as a ray JV. This ray also comes to an illuminating light propagated in a direction adjacent to the forward direction.

One practical range of a summit angle value of each prism element in the prism shaped irregularity formed in the light emitting surface 74 of the wedge type emitting direction characteristic adjusting element 70, is equal to 80° to 120° (for example, 95°). A pitch of the prism shaped irregularity may, as is the case of the light input surface 73, preferably be equal to or less than 50 5 m in a range where a diffraction effect does not arise.

The exemplified explanation of the optical path as hereinbefore described is a little different in a light emitting direction correction operation depending on a tilting angle of the oblique surface formed in the light emitting surface 74 or depending on a refractive index of material used for the wedge type emitting direction characteristic adjusting element 70. However, it is maintained that a tendency of dispersion of a light in a transverse direction by refraction of the prism shaped irregularity is suppressed.

In the embodiment in FIG. 18, also it is needless to say that a degree of sharpness of the directionality characteristic is suitably adjusted as to the longitudinal direction and as to the transverse direction through variation of intensity of the scattering power of the wedge type emitting direction characteristic adjusting element 70.

Various kinds of changes are considered for a shape of the prism shaped irregularity formed in the light input surface 73 or the light emitting surface 74 of the wedge type emitting direction characteristic adjusting element 70. For example, the prism shaped irregularity is formed in a pattern of a circular cone protrusion group, and not in a line shape, thus it is possible for each protrusion to execute a light emitting direction adjustment function as to both of the longitudinal and transverse directions.

Material and methods of manufacturing the light scattering conducting element 61 and the wedge type emitting direction characteristic adjusting element 70, may preferably be applied as is the case of the light scattering conducting block or the light diffusion plate as formerly described.

In the case of using a transparent property for a wedge type emitting direction characteristic adjusting element, various kinds of transparent polymers can be utilized. Representative polymers for such are shown in Tables 1 and 2.

When employing those polymers as a polymer matrix and molding into a predetermined shape by giving a scattering power, then a light scattering conducting element or a wedge type emitting direction characteristic adjusting element with a light diffusion property can be obtained. Methods of producing a refractive index ununiformity structure for giving the scattering power is as listed below.

(1) The different refractive index particle shaped material is dispersed into the polymer matrix by kneading.

(2) The polymers having different refractive indices are each kneaded.

(3) Polymerizing process is used.

A method of molding may be applied as an injection molding or an extrusion molding, preferably.

Details of the method of manufacturing and the method of molding such materials are the same as formerly described in the paragraphs on the light scattering conducting block or the light diffusion plate, therefore the explanation in detail thereof will be omitted throughout the specification.

Some of examples for manufacturing are listed below.

Manufacturing Example 1

The pellet of methacylresin (ASAHI CHEMICAL Co., Ltd.; DELVET 80N) is added by 0.3 wt % of silicone series resin particles (TOSHIBA SILICONE Co., Ltd.; TOSPEARL 108) with a particle size of 0.8 $\mu$m, the resultant is mixed and dispersed by a mixer, thereafter protruded by a protrusion machine, and pelletized by a pelletizer, thereby a pellet where silicone series resin particles are uniformly dispersed therein is produced.

Thus produced pellet is molded by an injection molding machine under the condition of a cylinder temperature 230° C. to 260° C., a die temperature 50° C. to produce a wedge type light scattering conducting element where the size thereof is of a height 68 mm, a width 85 mm, and a thickness 3.8 mm to 0.2 mm in a longitudinal direction but in gradual variation therebetween.

A correlation distance of thus manufactured light scattering conducting element satisfies a=0.53 um, and an estimated calculation value of an effective scattering irradiation parameter by the equation (11) satisfies E=12.6 [cm$^{-1}$].

Manufacturing Example 2

MMA is added by 0.3 wt % of silicone series resin particles with a particle size 0.8 $\mu$m (TOSHIBA SILICONE Co., Ltd.; TOSPEARL 108), and by known suspension polymerization procedure, spherical shaped particles where the particles are uniformly dispersed are obtained. The resultant is, as in the manufacturing example 1, made into a pellet by the pelletizer, thereby a pellet in which the silicone series resin particles are uniformly dispersed is produced.

Hereinafter, under the same condition as the manufacturing example 1, the same type of wedge type light scattering conducting element is obtained. This light scattering conducting element has an external view where no difference is found from that light scattering conducting element produced in the manufacturing example 1. A correlation distance satisfies a=0.53 $\mu$m, and an estimated value of the effective scattering irradiation parameter by the equation (11) meets E=12.6 [cm$^{-1}$].

Manufacturing Example 3

Polymethylmethacrylate (PMMA) is added by 0.5 wt % of polystyrene (PSt), and mixed for 10 minutes by a V type tumbler and for 5 minutes by a HENSCHER mixer. The mixture obtained is fused and mixed by a two shaft type protrusion machine "NAKATANI MACHINE Co., Ltd.;" with a diameter 30 mm under the condition of a cylinder temperature 220° C. to 250° C., a screw rotational speed 75 rpm, a discharge amount 6 kg/hr, thereby a pellet is produced.

The obtained pellet is molded by the injection molding machine under the condition of a cylinder temperature 220° C. to 250° C., a die temperature 65° C., a middle injection speed, an injection pressure 2 short shot pressure plus 10 kg/cm$^2$. Thus, a wedge type light scattering conducting element with a height 68 mm, a width 85 mm, a thickness gradually varying from 3.8 mm to 0.2 mm in a longitudinal direction is obtained.

Manufacturing Example 4

MMA (methylmethacrylate) is added of respective 0.05 wt %, 0.08 wt %, 0.10 wt %, and 0.15 wt % of silicone series resin powders with a particle size 29 $\mu$m (TOSHIBA SILICONE Co., Ltd.; TOSPEARL 120), and uniformly dispersed four kinds of test materials and particle MMS test material are prepared, to each of which is added 0.5 wt % of benzoylperoxide (BPO) as a radical polymerization starting agent and 0.2 wt % of n-laurylmereaptan (n-LMO as a chain transfer agent, and casting-polymerized for 24 hours at 70° C., and a wedge type light scattering conducting element with a height 68 mm, a width 85 mm, and thickness having gradual variation in a longitudinal direction from 3.8 mm to 0.2 mm is manufactured at every sheet basis.

Manufacturing Example 5

To MMA (methylmethacrylate) is added 0.025 wt % of silicone oil, and uniformly dispersed, and further added 0.5 wt % of benzoilperoxide (BPO) as a radical polymerization starting agent and by 0.2 wt % of n-butylmercaptan (n-BM) as a chain transfer agent, further soled for 30 minutes at a temperature 30°, thereafter further casting-polymerized for 24 hours at 65° C., thereby a wedge type light scattering conducting element with a height 68 mm, a width 85 mm, and a thickness having a gradual variation in a longitudinal direction ranging from 3.8 mm to 0.2 mm is produced.

Manufacturing Example 6

To PMMA (polymethylmethacrylate) is added by 0.08 wt % of silicone series resin powders (TOSHIBA SILICONE Co., Ltd.; TOSPEARL 120) with a particle size 2/im, and mixed for 10 minutes by a V type tumbler and for 5 minutes by HENSCHER mixer. The resultant is fused and mixed by a two axis protrusion machine (a cylinder temperature 220° C. to 250° C.) and protruded and molded, thus a pellet is produced.

This pellet is injected and molded by an injection molding machine under the condition of a cylinder temperature 220° C. to 250° C., thereby a wedge type light scattering conducting element with a height 68 mm, a width 85 mm, and a thickness having a gradual variation in a longitudinal direction ranging from 3.8 mm to 0.2 mm is produced.

In each manufacturing example as described, in the case where an amount of added different refractive index materials are made smaller than the case of the light scattering conducting element, and further made to a prism shaped irregularity molding type corresponding to a form as explained for metallic die on injection molding, a wedge type emitting direction characteristic adjusting element having a desired configuration of prism shaped irregularity can be obtained.

One of the uses of a surface light source device according to the invention as described is a backlight light source used for a liquid crystal display device. FIG. 19 is a sectional view showing a basic arrangement of a surface light source device according to the invention. In the drawing, symbol BL depicts a surface light source device arranged as a backlight, where as one example is employed a surface light source device having a little suppressed directionality in forward direction. The surface light source device is provided with a wedge type emitting direction characteristic adjusting element 70 having a weak scattering power. A silver foil sheet 67 treated by an oxidation prevention process is provided as embracing from a backside a fluorescent lamp L used for the light source. A spacer for maintaining a gap width of the air layer AR at a constant value is provided between the light scattering conducting element 61 and the wedge type emitting direction characteristic adjusting element 70.

A liquid crystal display panel LP is disposed at a forward direction of the surface light source device which functions as a backlight BL. The liquid crystal display panel LP is formed of two sheets of polarizers 81 and 83 whose polarized light transmitting axes are orthogonally arranged, and a liquid cell 82 (including elements such as electrodes and the like) disposed between the polarizers.

A uniform illuminating flux having a suitable extent of directionality is emitted from the surface light source device (backlight BL) employed in the present example to a substantially vertical direction for the liquid crystal display panel PL. Therefore, there can be observed a bright and uniform display image from the forward direction of the liquid crystal display. Since a suitable spread is given to the directionality, there does not arise a sudden change to dark when observing the display in a some extent shifted position from the forward direction.

In the embodiment as hereinbefore described, a rod shaped fluorescent lamp is used as a light source. However, according to the present invention, it is understood that a light source used for the surface light source device is not limited to such rod shaped fluorescent lamp. This may be apparent from a principle of the invention and the foregoing hereinbefore shown and described. For example, plurality of beams from a light emitting diode array may preferably be made an incident light.

What is claimed is:

1. A surface light source device comprising:

a plate shaped light transfer element having light conducting and light scattering properties, the light transfer element having a light output side, a back side opposite the light output side, a thickness direction extending from the light output side to the back side and at least one light input surface extending generally in the thickness direction, the light transfer element having a plurality of light scattering volume regions which have complimentary shapes such that the plurality of light scattering volume regions fit together and collectively form a plate shape, each of the light scattering volume regions having a different light scattering power with each light scattering volume region being produced by a molding process in which a plurality of materials respectively having different refractive indices are kneaded together, light incident means for supplying light to the at least one light input surface of the light transfer element so that the light is conducted and scattered and then emitted from the light output side, and the light transfer element having an average light scattering power in the thickness direction which increases with increasing distance from the at least one light input surface, the average light scattering power being greater toward the back side than toward the light output side.

2. A surface light source device according to claim 1, wherein each light scattering volume region has a light scattering power expressed by an effective scattering irradiation parameter Ei which is in the range of 0.0001 cm$^{-1}$≦Ei≦1000 cm$^{-1}$ and a correlation distance ai for the correlation function $\gamma(r)=\exp[-r/ai]$ in the range of 0.005 $\mu$m≦ai≦50 $\mu$m, where "r" is a distance between two points within the light scattering volume region.

3. A surface light source device of claim 1, wherein said surface light source device further comprises light emitting direction correcting means to correct the direction of scattered light emitted from said light transfer element.

4. A surface light source device of claim 1, wherein the molding process used to produce at least one of the light scattering volume regions includes an injection molding step.

5. A surface light source device of claim 1, wherein the molding process used to produce at least one of the light scattering volume regions includes an extrusion molding step.

6. A surface light source device of claim 1, wherein at least one of the light scattering volume regions is formed of a polymer matrix containing particulate material having a refractive index different from that of the polymer matrix such that when the polymer matrix and particulate material are kneaded together in the molding process, the particulate material diffuses into the polymer matrix.

7. A surface light source device of claim 1, wherein at least one of the light scattering volume regions is formed of a polymer matrix containing particulate material having a refractive index different from that of the polymer matrix such that when the polymer matrix and particulate material are kneaded together in the molding process, the particulate material diffuses into the polymer matrix, and the molding process used to produce the at least one light scattering volume region formed of a polymer matrix includes an injection molding step.

8. A surface light source device of claim 1, wherein
at least one of the light scattering volume regions is formed of a polymer matrix containing particulate material having a refractive index different from that of the polymer matrix such that when the polymer matrix and particulate material are kneaded together in the molding process, the particulate material diffuses into the polymer matrix, and
the molding process used to produce the at least one light scattering volume region formed of a polymer matrix includes an extrusion molding step.

9. A surface light source device, comprising:
a light transfer element having light conducting and light scattering properties, the light transfer element having a light output side, a back side opposite the light output side, a thickness direction extending from the light output side to the back side, at least one light input surface extending generally in the thickness direction, and a plurality of light scattering volume regions,
wherein each region has a complimentary shape, such that the plurality of light scattering volume regions fits together, has a different light scattering power, and includes materials having different refractive indices;
a source supplying light to the at least one light input surface so that the light is conducted, scattered and then emitted from the light output side, and
the light transfer element having an average light scattering power in the thickness direction which increases with increasing distance from the at least one light input surface, the average light scattering power being greater toward the back side than toward the light output side.

10. The device according to claim 9, wherein each light scattering volume region has a light scattering power expressed by an effective scattering irradiation parameter Ei which is in the range of $0.0001 \text{ cm}^{-1} \leq Ei \leq 2000 \text{ cm}^{-1}$, and a correlation distance ai for the correlation function $\gamma(r) = \exp[-r/ai]$ in the range of 0.005 μm, where "r" is a distance between two points within the light scattering volume region.

11. The device of claim 9, further comprising a member to correct the direction of scattered light emitted from said light transfer element.

12. The device of claim 9, wherein the molding process used to produce at least one of the plurality of light scattering volume regions includes an injection molding step.

13. The device of claim 9, wherein the molding process used to produce at least one of the plurality of light scattering volume regions includes an extrusion molding step.

14. The device of claim 9, wherein at least one of the plurality of light scattering volume regions is formed of a polymer matrix containing particulate material having a refractive index different from that of the polymer matrix, and the particulate material is diffused in the polymer matrix.

15. A surface light source device of claim 9, wherein at least one of the plurality of light scattering volume regions is formed of a polymer matrix containing particulate material having a refractive index different from that of the polymer matrix and the particulate material is diffused in the polymer matrix, and
the molding process used to produce the at least one light scattering volume region includes an injection molding step.

16. A surface light source device of claim 9, wherein
at least one of the plurality of light scattering volume regions is formed of a polymer matrix containing particulate material having a refractive index different from that of the polymer matrix such that when the polymer matrix and the particulate material is diffused in the polymer matrix, and
the molding process used to produce the at least one light scattering volume region includes an extrusion molding step.

* * * * *

UNITED STATES PATENT AND TRADEMARK OFFICE
CERTIFICATE OF CORRECTION

PATENT NO.: 5,899,552
DATED : May 4, 1999
INVENTOR(S): Kazuaki YOKOYAMA, et al.

It is certified that error appears in the above-identified patent and that said Letters Patent is hereby corrected as shown below:

On the title page, item [75],
INVENTORS: change "534-34, Ichigao-cho, Midor-ku, Yokohama-shi, Kanagawa, 225" to --Yokohama--

Item [73],
ABSTRACT: line 19, change "A" to --a--.

Col. 3,
  line 36, change "the-light" to --the light--.
Col. 5, line 49, change "E1" to --Ei--.

Col. 8, line 31, change "1O" to --IO--;
  line 46, delete "00";
  line 49, change "Vv=[(4<N²>λ₀⁴]Cy(r)dr" to $$Vv = [(4\langle\eta^2\rangle\pi^3)/\lambda_0^4] \int_\infty C\gamma(r)\,dr$$

Col. 8, line 63, change "<72²>" to --<LN²>--.

Col. 9, line 42, change "ir radiation" to --irradiation--.

UNITED STATES PATENT AND TRADEMARK OFFICE
CERTIFICATE OF CORRECTION

PATENT NO.: 5,899,552
DATED : May 4, 1999
INVENTOR(S): Kazuaki YOKOYAMA, et al.

It is certified that error appears in the above-identified patent and that said Letters Patent is hereby corrected as shown below:

Col. 10, line 6, change "11 all" to --all--.

Col. 12, line 59, delete "it".

Col. 13, line 42, change "transparent-light" to --transparent light--.

Col. 14, line 34, after "regions" insert --.--; and
  line 41, after "provided" insert --on--.

Col. 16, line 52, after "type" insert --include--.

Col. 18, line 36, change "a-selection" to --a selection--.

Col. 19, line 17, after "region" insert --centered--; and
  line 20, after "range" insert --centered--.

Col. 20, line 61, change "Γ2" to --Γ1--; and
  line 65, change "39" to --3--.

Col. 21, line 9, change "toconstitute" to --to constitute--;
  line 52, change "65 T" to --65°C--;
  line 53, delete "2"; and
  line 60, change "(PMKA)" to --(PMMA)--.

UNITED STATES PATENT AND TRADEMARK OFFICE
CERTIFICATE OF CORRECTION

PATENT NO.: 5,899,552
DATED : May 4, 1999
INVENTOR(S): Kazuaki YOKOYAMA, et al.

It is certified that error appears in the above-identified patent and that said Letters Patent is hereby corrected as shown below:

Col. 22, line 28, after "region" insert --.--.

Col. 24, line 36, after "provided" insert --on--.

Col. 27, line 16, after "element" insert --.--.

Col. 28, line 64, after "64" insert --in--.

Col. 30, line 42, change "509 m" to --509$\mu$m--.

Col. 32, line 35, change "Hi" to --H1--.
      line 48, change "JV" to --J3--.

Col. 34, line 42, change "29" to --2--.

Col. 35, line 1, change "2/im" to --2$\mu$m--.

Signed and Sealed this

Twenty-third Day of January, 2001

Attest:

Q. TODD DICKINSON

*Attesting Officer*     *Commissioner of Patents and Trademarks*